June 17, 1947.    W. J. FINNEGAN    2,422,536
APPARATUS FOR TREATMENT OF FOODS BY DEHYDRATION OR REFRIGERATION
COMPRISING TRUCKS AND A TREATING ENCLOSURE
Filed Jan. 11, 1943    10 Sheets-Sheet 1
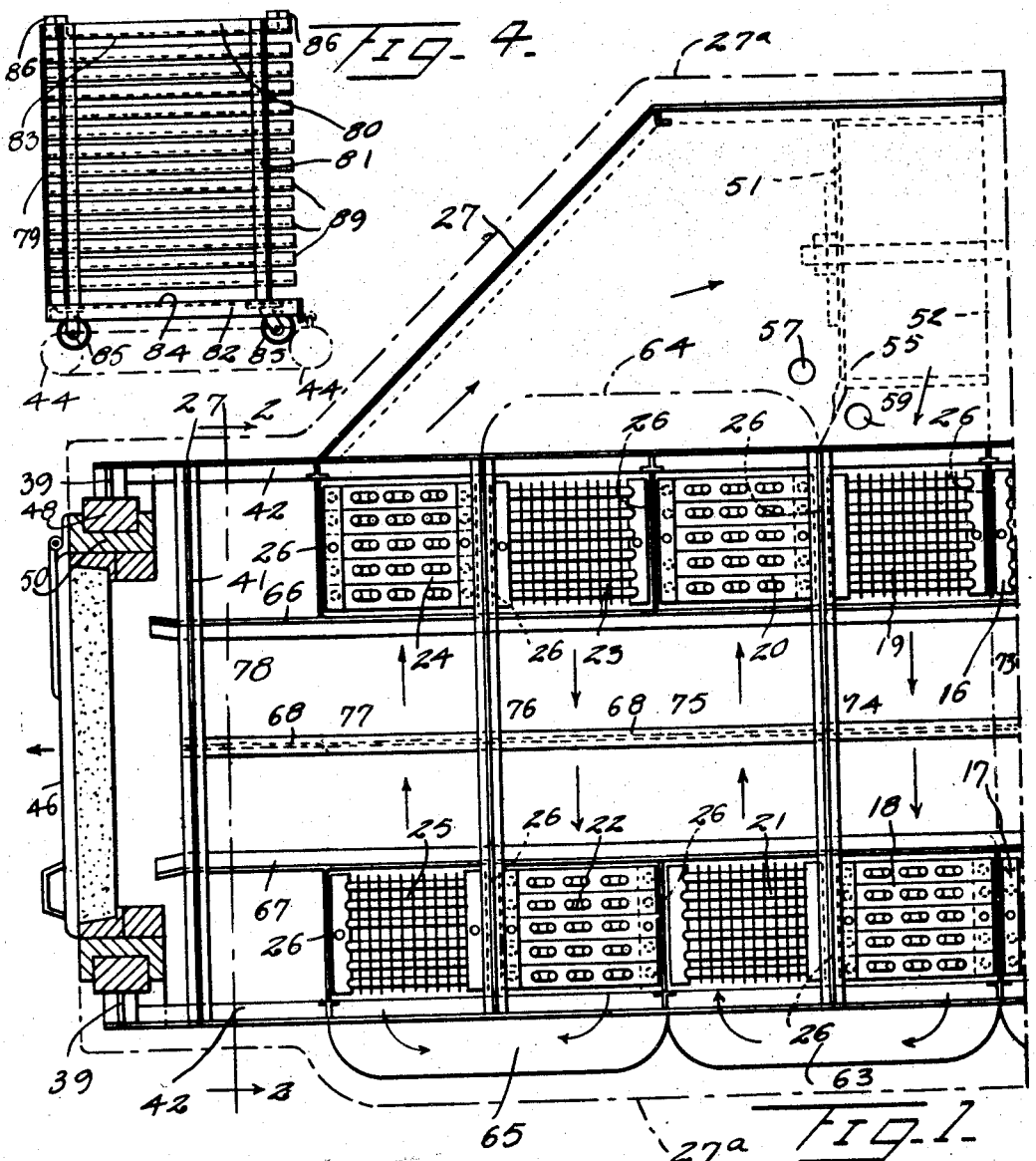
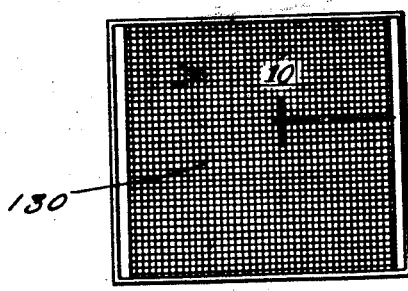
Inventor
W. J. Finnegan
By F. C. Bryant
Attorney.

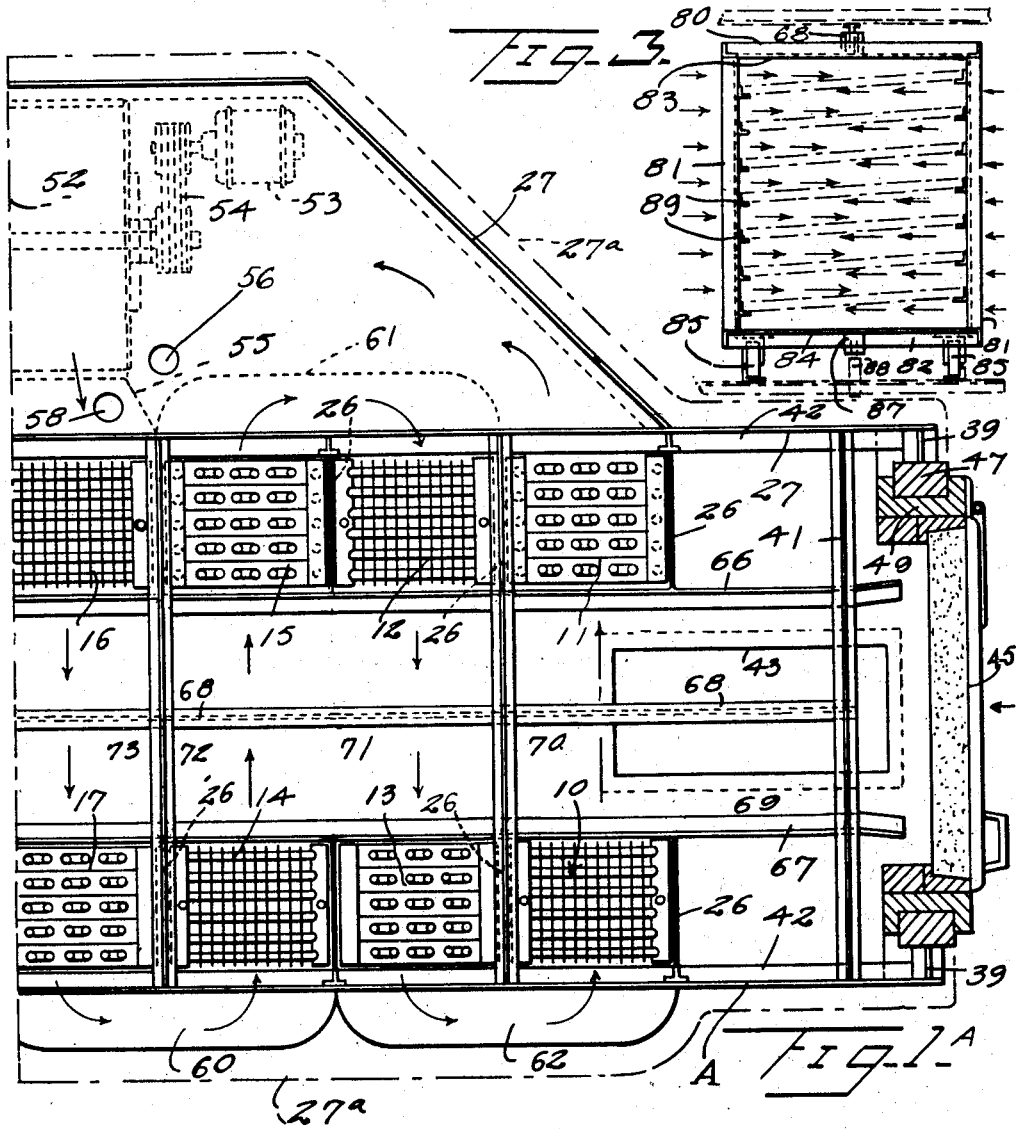

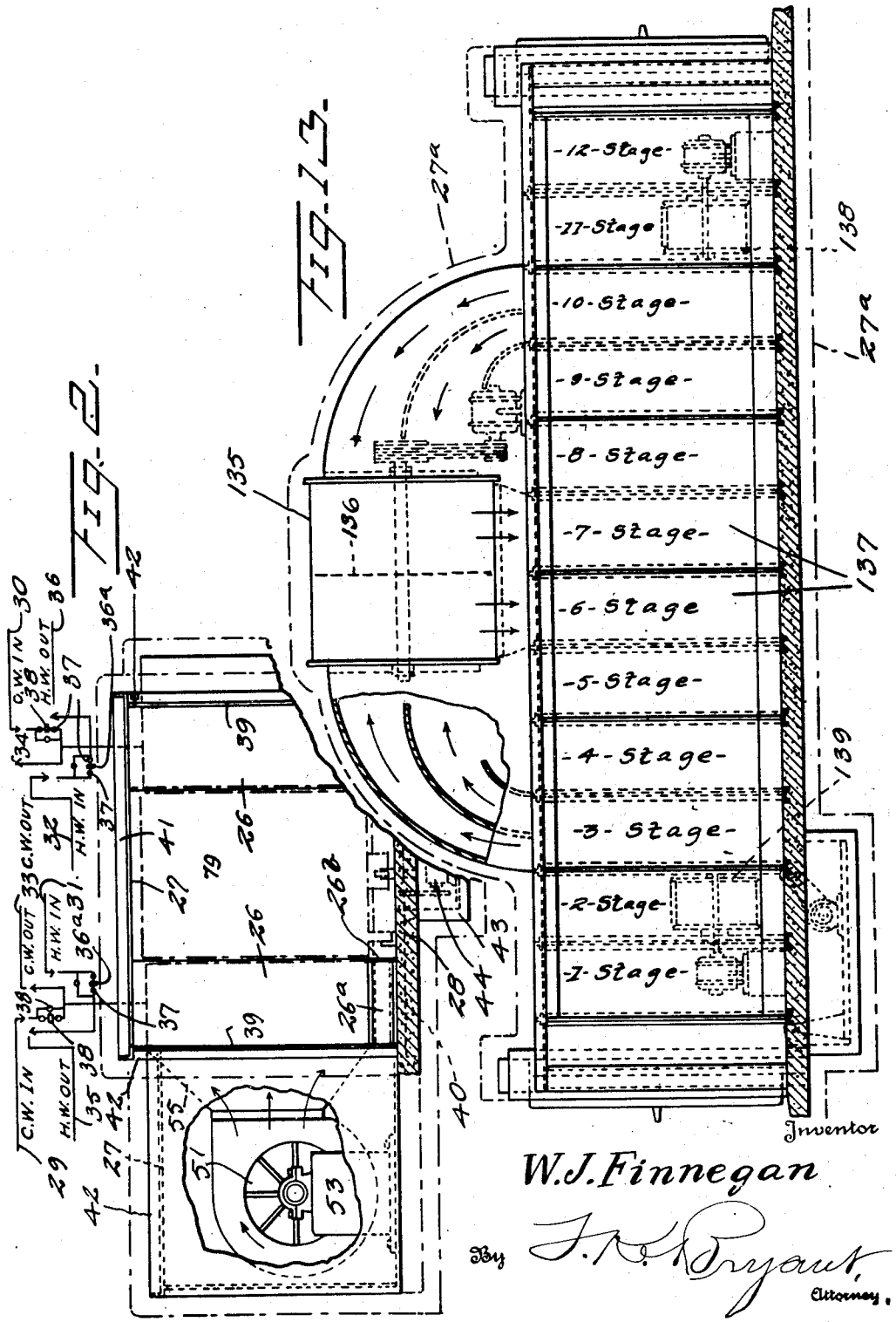

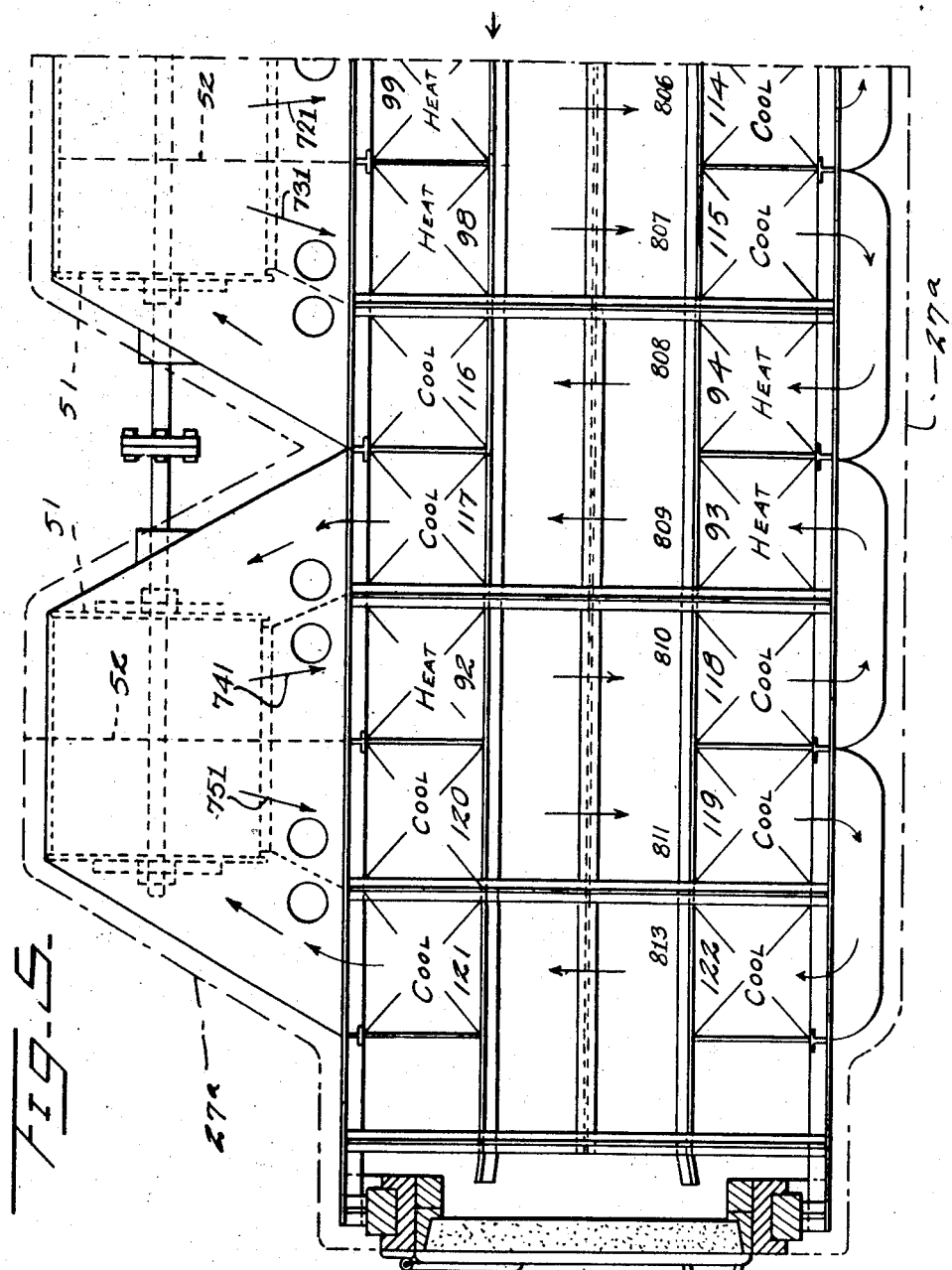

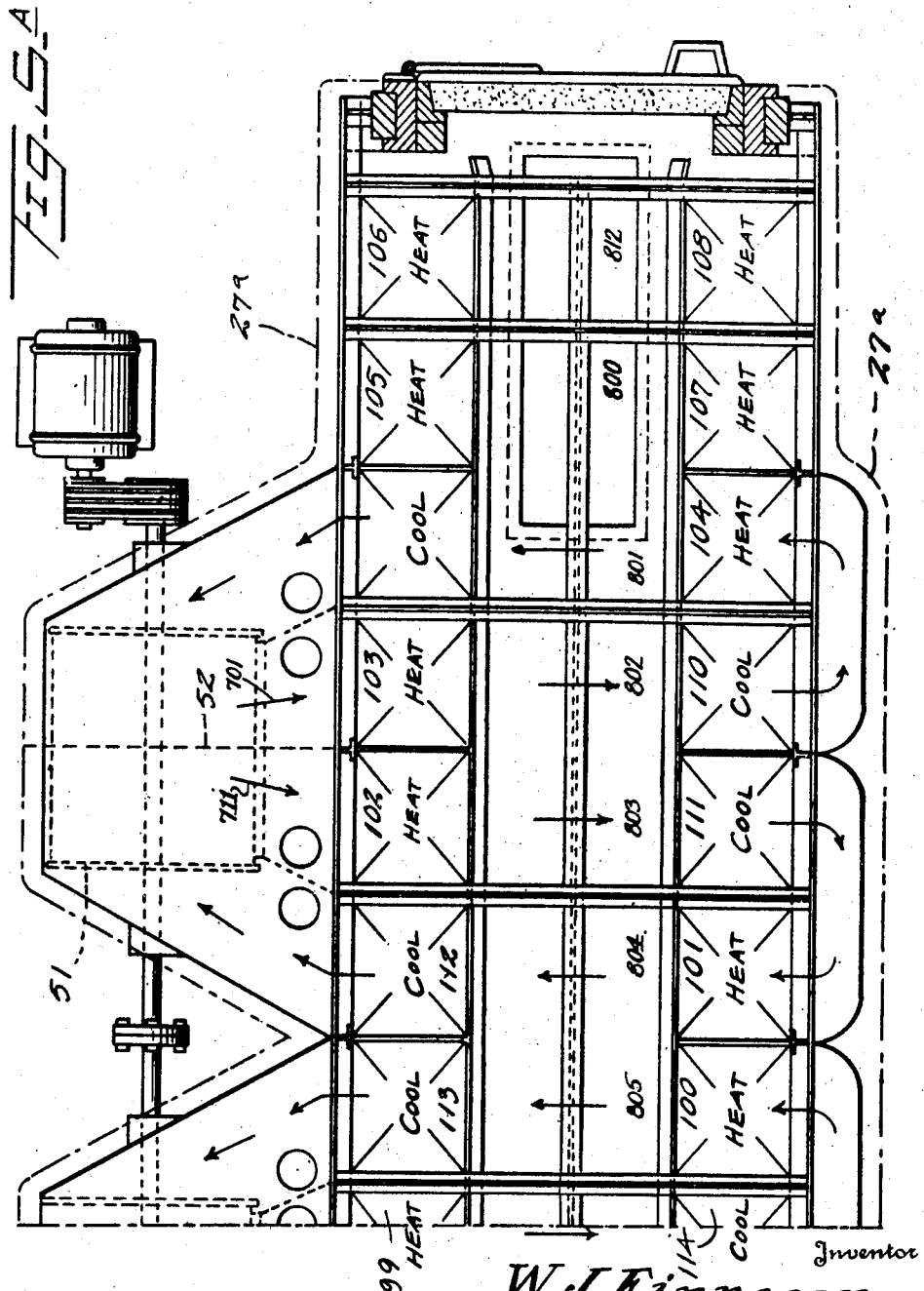

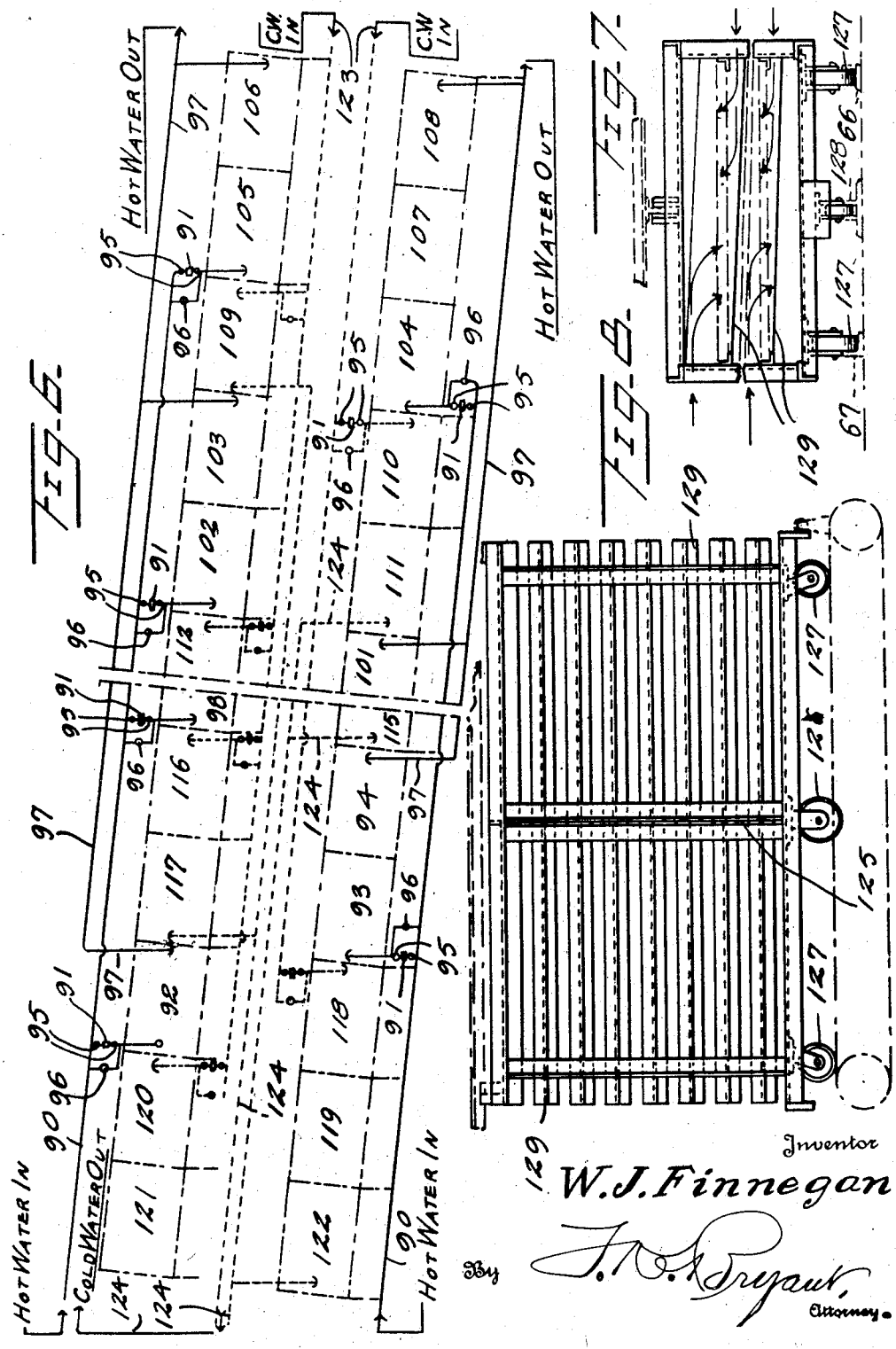

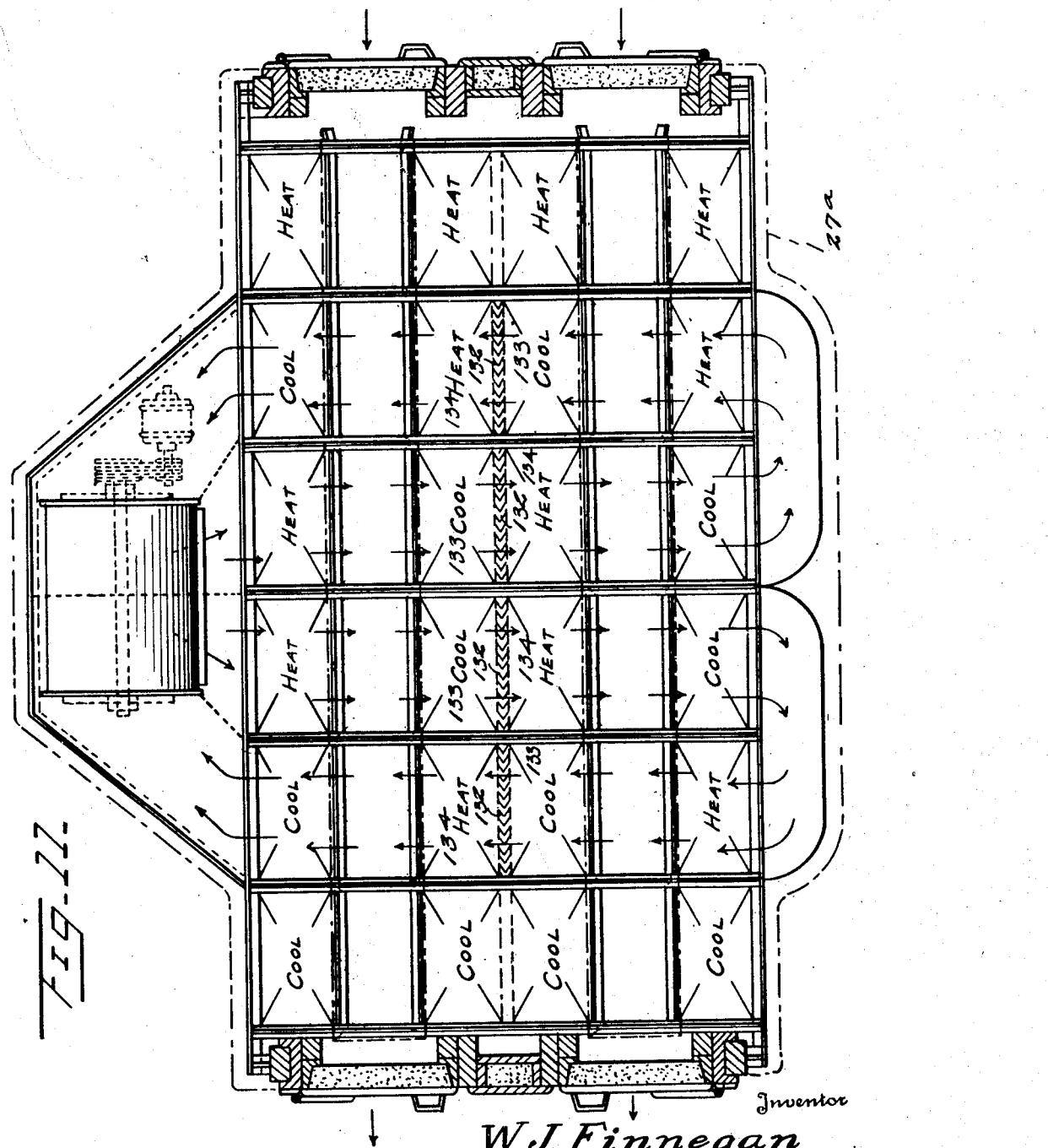

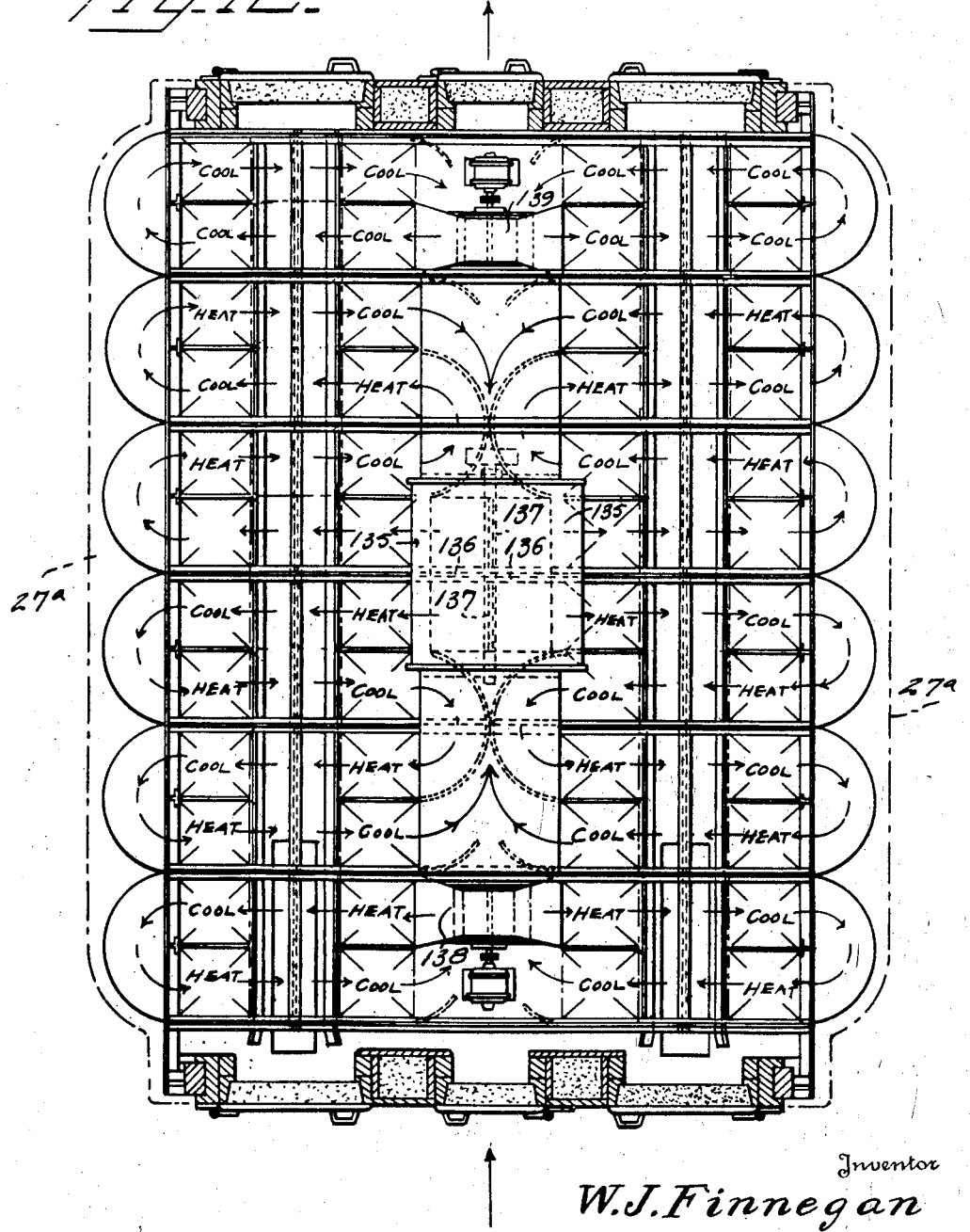

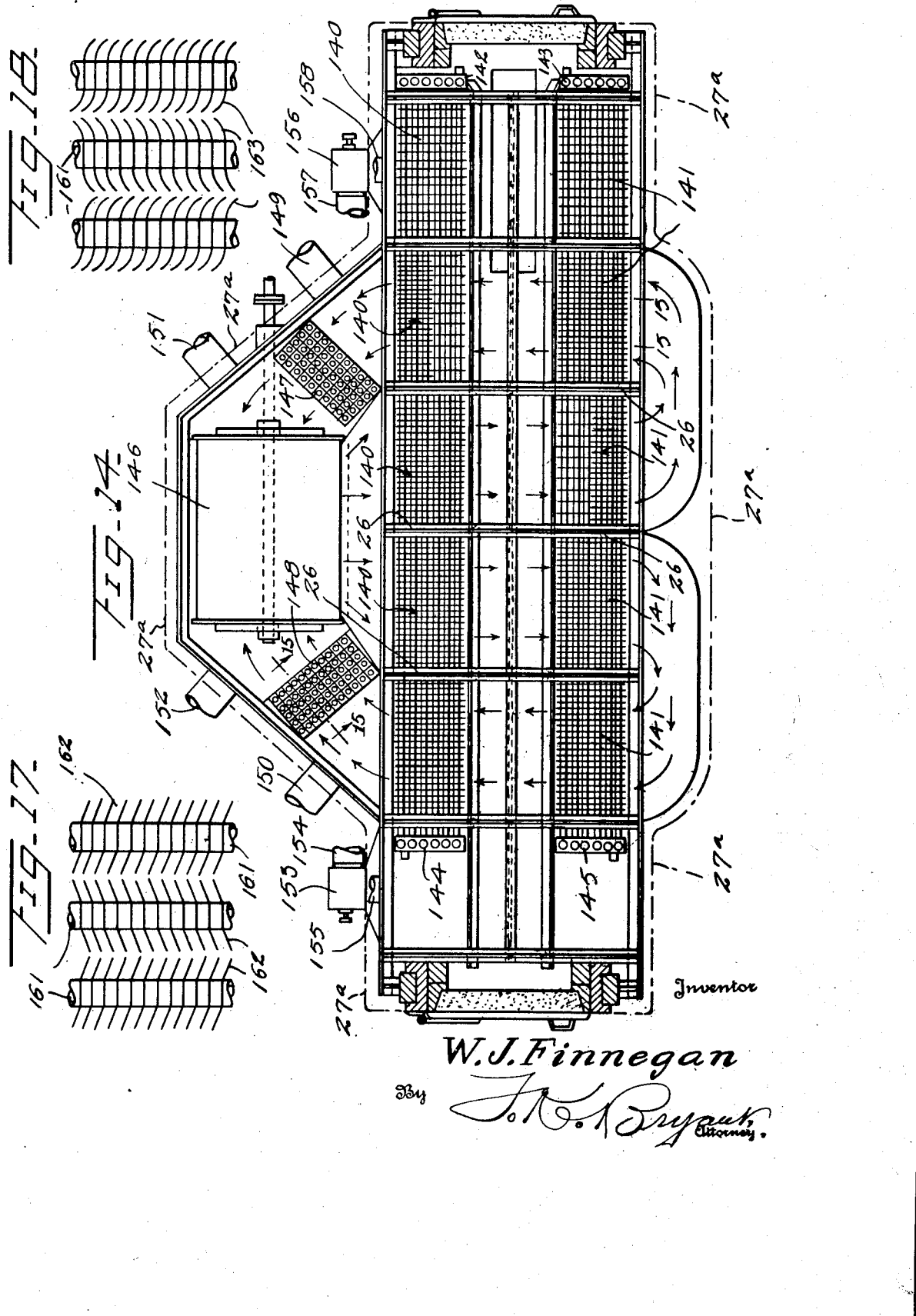

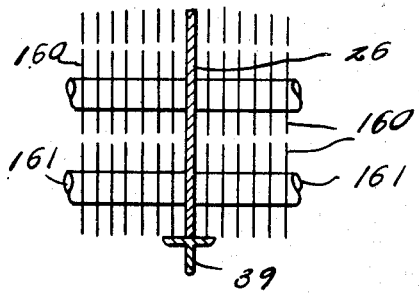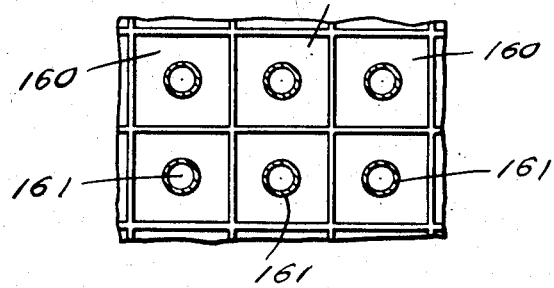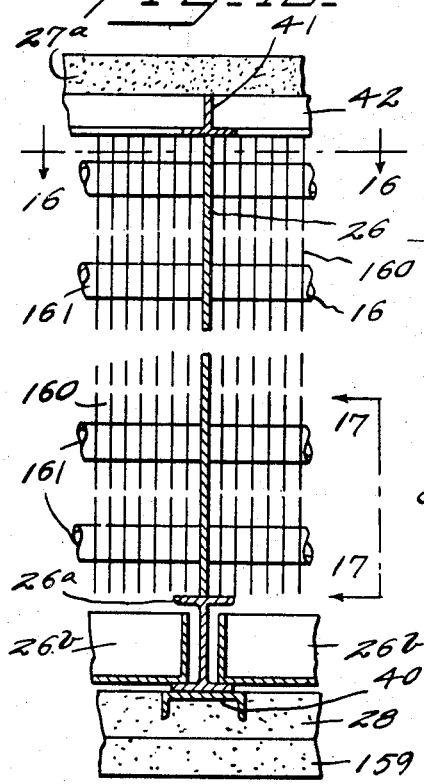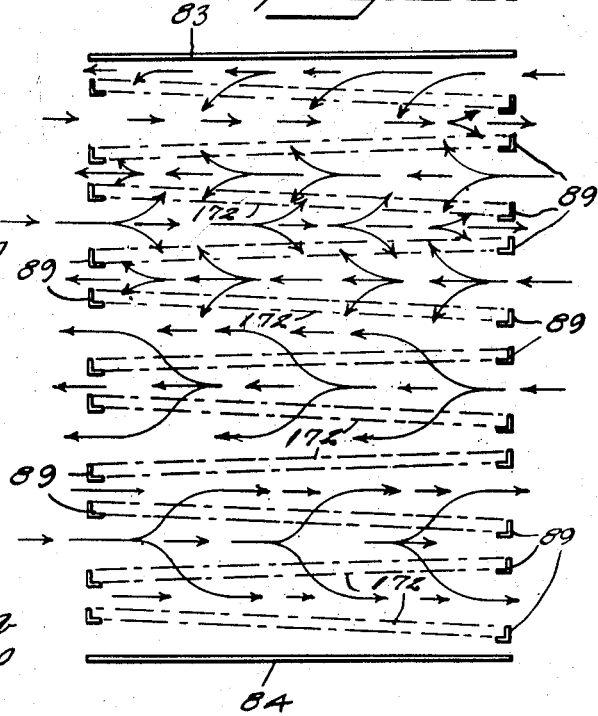

Patented June 17, 1947

2,422,536

UNITED STATES PATENT OFFICE 2,422,536

APPARATUS FOR TREATMENT OF FOODS BY DEHYDRATION OR REFRIGERATION COMPRISING TRUCKS AND A TREATING INCLOSURE

William J. Finnegan, Jacksonville Beach, Fla.

Application January 11, 1943, Serial No. 472,023

5 Claims. (Cl. 34—77)

1

This invention relates to certain new and useful apparatus for treatment of foods by dehydration or refrigeration comprising trucks and a treating inclosure.

The primary object of this invention resides in the provision of a novel apparatus wherein a rapid and improved method of treating materials by dehydration or refrigeration can be practiced.

In prior methods and apparatus used for quick freezing or dehydrating of foods, and other materials requiring similar treatments, a separate apparatus was used in each instance for the treatment of materials by either refrigeration or dehydration. Owing to the fact that it is exceedingly important to reduce evaporation of moisture from the materials to a minimum while being subjected to the refrigerating treatment, on the other hand, the maximum acceleration in evaporation of moisture from the materials during the dehydrating treatment is equally important. Hence, another object of the invention is to provide a single apparatus wherein an efficient and economic means is provided by reversing the heat transferring cycle and establishing certain conditions known to be most desirable for the treatment of materials by either refrigeration or dehydration.

It is well known that the optimum physical conditions of the air for treating various materials by dehydrating have wide variations. Therefore, another important object of this invention is to progressively stage the treatment and thereby separate the numerous air zones used for treating the foods in each of the numerous compartments or stages so the physical condition of each air stream in regard to its temperature and relative humidity is controlled and therefore fixed at a point known to be optimum for the kind of material being treated, thus assuring that each material is progressively subjected to dehydrating conditions that will not adversely affect the material, but will produce a maximum capacity of dehydrating material with an improvement in quality and appearance.

In the treatment of foods and the like by dehydration or refrigeration it is well known to all skilled in the art that an even and uniform distribution of air over the foods being treated is a very important factor in producing efficient and economic operations and good quality frozen or dehydrated foods. Also that agitation of seed foods, such as peas, beans and the like, as well as small cubed and shredded foods, during the dehydrating treatment is exceedingly important if

2 the quality of the food and economic capacity of the apparatus is to be maintained. Therefore, another and important object of this invention is to provide a new and novel method of uniformly distributing the recirculating air over the foods being treated, and to provide an economic and efficient means for agitating small particles of foods during their treatment by dehydration.

Another and important object of the invention is to provide a novel method of dehumidifying the recirculated air and remove moisture from said air in the various zones without reducing the temperature of the air in such zones to the dew point corresponding to their prevailing temperature while treating materials by dehydration, and to further provide efficient means for utilizing a limited addition of outside atmospheric air in the various air compartments or zones when the physical condition of the prevailing atmosphere will promote further the economy and efficiency in the dehydration of materials.

A further object of the invention is to provide efficient means for inactivating enzyme activity in some fruits and vegetables by initial blanching of such foods prior to the dehydrating treatment and forecooling the dehydrated materials before they are discharged from the food treating stages so that all dehydrated materials will be ready for packaging and storage or shipment without further treatment.

With the above and other objects in view that will become apparent as the nature of the invention is better understood, the same consists in the novel combination and arrangement of parts hereinafter more fully described, shown in the accompanying drawings and claimed.

In the accompanying drawings:

Figures 1 and 1A are match line top plan views of a heat exchange apparatus with part of the top casing removed, the better to show the arrangement of heat transferring surfaces and method of air circulation.

Figure 2 is a vertical cross-section part end view on line 2—2 of the heat exchange apparatus shown in Figure 1, showing the arrangement of heat transferring surfaces, stage baffles, fan, air ducts, conveyor, trucks with food trays and pipe connections for the heat transferring vehicles:

Figure 3 is a front end elevation of a truck, with food trays shown in phantom, showing the method of air circulation over the trays and means for guiding the truck with trays through the heat exchange apparatus with said means and arrangement of conveyor shown in phantom.

Figure 4 is a side elevation of the food truck with trays as shown in Figure 3, and with the conveying means shown in phantom.

Figures 5 and 5A are match line top plan views of another form of heat exchange apparatus with the top casing removed the better to show the arrangement of heat transferring surfaces, fans, method of air circulation and means for guiding the trucks with food trays through the apparatus.

Figure 6 is an isometric diagrammatic illustration, partly broken away, of piping connections for circulating the heat transferring vehicles to and from the various heat transferring stages of the apparatus shown in Figure 5 and is typical of the piping connections for all apparatus shown.

Figure 7 is a vertical front end view of another form of truck with food trays shown in phantom and another method of air circulation wherein baffles are used to force some of the recirculated air upwardly and downwardly through the food trays, with means for guiding the truck through the heat exchange apparatus shown in phantom.

Figure 8 is a side elevation of the truck with trays shown in Figure 7, and with the conveying means shown in phantom.

Figure 9 is a top plan view of a food tray.

Figure 10 is an enlarged vertical cross-section part end view on line 10—10 of the food tray shown in Figure 9, showing construction details.

Figure 11 is a top end view, partly in section, of another form of heat exchange apparatus with the top casing removed the better to show the arrangement of heat transferring surfaces, and the method of air circulation where two food treating tunnels are employed.

Figure 12 is a top plan view, partly in section, of another form of heat exchange apparatus with the top casing removed, the better to show the arrangement of heat transferring surfaces, method of air circulation wherein two food treating tunnels are employed with the fans located at the top and at each end of the apparatus.

Figure 13 is a side elevation, partly in section, of the heat exchange apparatus shown in Figure 12.

Figure 14 is a top plan view, partly in section, of another form of heat exchange apparatus with the top casing removed, the better to show the arrangement of the heat transferring surfaces, fan, method of air circulation, dehumidifying elements and means for guiding the trucks with food trays through the apparatus.

Figure 15 is an enlarged vertical part sectional side view on line 15—15 of Figure 14 showing a typical arrangement of heat exchange surfaces used for cooling air in apparatus shown in Figures 1, 2, 5, 11, 12, 13 and 14 to better show typical supports for the heat exchange surface, arrangement of drip pans under surfaces and ceiling construction.

Figure 16 is a part section top plan view on line 16—16 of Figure 15 showing the arrangement of coils with extended finned surfaces and stage partition air baffle.

Figure 17 is an enlarged vertical part sectional view on line 17—17 of the air dehumidifying elements shown in Figure 15 showing the direction of air flow through the offset fins on coil surfaces as required to eliminate moisture, due to condensation, from the air stream.

Figure 18 is an enlarged vertical part sectional view similar to Figure 17 of another arrangement of fins on the coils of the dehumidifying elements shown in Figure 14 and shows another method of forming the fins so as to eliminate water vapor condensation from the air stream.

Figure 19 is an enlarged fragmentary top plan view of Figures 17 and 18 showing the typical arrangement of extended finned surfaces on all heat transferring surfaces used in the various forms of the heat exchange apparatus shown.

Figure 20 is a diagrammatic end view of trucks shown in Figures 3 and 7 with only top and bottom air baffles and angle iron tray guides and supports with an arrangement of food trays shown in phantom to better show the peculiar and desirable method of air circulation over the foods being treated.

Referring first to the apparatus shown in Figs. 1, 1A and 2, a generally rectangular tunnel such as a sheet-metal housing A is equipped with laterally spaced parallel rows of heat exchanging units 10 to 25 forming a path between them for travel therethrough of trucks hereinafter referred to more in detail, which trucks are of the same length as the length of each unit and are advanced progressively or intermittently as later set forth, the length of a unit. Baffles 26 are provided between the units 10 to 25 for alignment with backs 79 on said trucks in the different positions of the latter to coact with structure to be described to form lateral compartments 69 to 78 for travel of air therethrough in alternate or different directions for treatment of material carried by the trucks. Housing A has flooring 28 and a lateral enlargement or auxiliary housing at 27. All heat transferring surfaces or units and said air baffles are supported by T-irons 26a (Fig. 2) which provide space under each heat transferring element for drip pans 26b which are preferably made of sheet metal. The heat transferring surfaces or units 10 to 25 inclusive may be made and formed of any suitable materials as by continuous bent and welded steel pipe coils with welded pipe distributing headers and extended sheet metal finned surfaces, each heat transferring stage or compartment being fitted with pipe valves and connections for circulating the heat transferring agents through the pipe of the heat transferring surfaces or units consisting of inlet piping 29, 30, 31, and 32 to be fitted with an automatic temperature regulating valve 36a with stop valves 37 on each side and with by-pass valve and connections 38. Coils and fin surfaces are preferably galvanized by the hot process after fabrication to insure a good metallic bond between the fin surfaces and coils. The hermetically sealed sheet metal housing 27 which incloses the top and exposed sides and ends of the apparatus is supported on and secured to the structural steel framework consisting of T irons and angle iron columns 39, T iron joists 41 and angle iron edge frame 42. All structural steel framework is preferably of welded construction and is supported by foundation channel irons 40 which are preferably grouted in concrete flooring 28. A conveyor pit 43 is arranged in the floor of the apparatus on the feeding end which accommodates the pusher type conveyor 44 (Figs. 2 and 4). The feeding and discharging ends of the apparatus are fitted with doors 45 and 46 which are preferably self air sealing and insulated. Doors 45 and 46 are securely supported by door bucks 47 and 48 together with door framing 49 and 50. Door bucks and framing are preferably made of suitable wood and sealed air-tight at all joints.

A recirculating air fan 51 is fitted with double air inlets and air impeller wheels with air division plate 52 between the wheels and joining the adjacent center stage baffle 26 to insure positive separation of the two recirculated air streams. The fan may be driven by an electric motor 53 with pulleys and V belt drive 54 or any other suitable and convenient means. The discharge from the said fan is housed by sheet metal funnel 55 which is hermetically sealed to the fan and air stage baffles 26 on each side and sheet metal housing 27 and hereby joins the top and bottom of the apparatus so as to provide even distribution of air from the fan over the faces of the two heat exchange surfaces 16 and 19. Intake vents 56 and 57 for air or other gas are provided in the top of fan housing together with outlet vents 58 and 59 as required for changing air in either of the circulatory air streams or for the charging of either stream with foreign gas such as nitrogen or the like, as may be desirable for the treatment of some foods. Each vent is preferably fitted with conventional means so that the intake and discharge of gas may be regulated for continuous or intermittent operation. Return air ducts 60, 61, 62, 63, 64 and 65 are arranged so as to alternately direct the air stream in a tortuous path or alternate directions through the food trucks shown in Figures 3, 4, 7 and 8 as they advance from one food treating compartment or stage to the next on their travel path through the apparatus. All air ducts are preferably made of formed sheet metal and fitted with air splitters which are not shown but are required for even distribution of the gas over all heat transferring surfaces of each stage. The food treating tunnel is fitted with angle iron tracks 66 and 67 which support and accurately guide the trucks shown in Figures 3 and 4 or Figures 7 and 8 through the food treating stages of the tunnel. In addition the top part of said trucks are guided by T-iron 68 (Figs. 1, 1A and 3) as hereinafter described.

Air recirculating fan 51 is fitted with two air impellers with a division plate 52 between. Said division is extended out on the discharge end of the fan to the air stage baffle 26 located in the center of the apparatus. Likewise, said baffle is extended from the fan to the fan housing so as to separate the air used in the first four freezing stages 70 to 73, inclusive, from the air used in the last four freezing stages 74 to 77, inclusive. Arrows show the direction of air flow through the eight separate freezing stages or compartments 70 to 77, inclusive, through the two heat transferring coil sections in each separate stage or compartment, through the distributing air ducts serving each stage or compartment and returning to the recirculating fan which has air inlets on each side and being enclosed by the hermetically sealed sheet-metal fan housing 27. It will be noted that after a truck with food on trays is advanced into the first freezing stage 70 the recirculated air flow is from left to right. When this truck is advanced into the next freezing stage 71 the direction of flow is then from right to left and when advanced again into the next freezing stage 72 the direction of flow of the air is again reversed and flows from left to right followed by a reverse directional flow again in the next freezing stage 73. This continued reverse action of air distribution through the following freezing stages 74 to 77 accelerates heat transfer from the foods very materially. In this connection it will be noted that the foods being treated on the trays of each truck during its passage through the eight freezing stages will be alternately subjected to four high velocity air streams passing from left to right through the restricted air flow passages between the food trays, and four air streams with similar action passing from right to left.

The trucks shown in Figures 3 and 4 accommodate and carry the food trays shown in Figures 9 and 10. Said food trucks form the ten food treating compartments or stages 69 to 78 inclusive and separate each individual compartment by means of the sheet metal air baffle 79 which forms and incloses the entire back of each truck (see Fig. 4). Said baffles 79 transversely register and align with the stage baffles 26 disposed at opposite sides thereof so as to form a series of separate food treating compartments or zones and one heat exchange element arranged on each side of each truck (a heater and a cooler, two heaters or two coolers) in each separate compartment or zone with the exception of the first and last compartments or stages 69 and 78 wherein there is no forced air circulation or heat exchange elements, thereby forming a relatively dead air space on the truck feeding and discharging ends of the apparatus. Each truck comprises a welded structural steel frame consisting of a top formed of angle irons 80, tray supporting side angle irons 81, bottom angle iron frame 82, top air directing plate 83 secured to angle irons 80 and bottom air directing plate 84 secured to said frame 82, forming the base of the truck, all preferably of welded construction. The bottom of the truck is fitted with four roller bearing steel wheels 85 which are preferably fixed with reenforcing to the bottom air directing plate by bolts and lock nut. Two of the wheels on the front end of each truck are of swivel type as required for ease of handling, rolling and guiding the truck on the channel iron guides 66 and 67 through the tunnel or over normal flooring external to the apparatus. The T-iron guide slippers 86 are preferably welded to the top angle iron frame and are arranged to receive the tunnel guide T-iron 68 as required for accurately guiding the trucks through the tunnel of the apparatus. A bearing and pusher lug 87 preferably made of steel and welded to the front of the said bottom angle iron frame 82, provides for contact with a pusher lug 88 preferably built integral with the sprocket chain of any conventional pusher type conveyor 44. The conveyor shown in phantom in Figures 2, 3 and 4 is located in the conveyor pit 43, and the operation of which consists in moving or advancing the trucks the length of one stage or compartment which is equal to the length of one truck. As each truck moves from the first stage or compartment 69, it advances the truck ahead of it into the next compartment zone or stage. When the trucks fill the tunnel each truck conveyed from the first compartment moves the truck in the last compartment or stage 78 out of the food treating tunnel through the outlet normally closed by insulated door 46, the trucks being initially manually shoved into the first compartment or stage 69. The column of trucks within the tunnel may also be advanced by hand shoving of the trucks, and thereby eliminating the use of the pusher conveyor 44 and pit 43, if this method of handling is preferable. Angle iron tray supporting guides 89 are preferably fixed to side angle irons by welding or may be fastened by screws which pass through slots in angle irons 81 as required for adjusting the spaced relation of food trays shown in Figures 9 and 10 and in phantom in Figure 3.

It will be noted that the tray supporting guides 89 are peculiarly arranged so the food trays set on an angle in relation to the direction of air flow from either side as the direction of said air flow alternates or reverses during the passage of the truck through the food treating tunnel. This method of contacting the air stream with the food on the trays accelerates the treatment of the foods as hereinafter fully described. It is to be noted that the trucks shown in Figures 7 and 8 with additional means for more effective air circulation through the food trays may be used in conjunction with the apparatus shown in Figures 1 and 2 or the trucks shown in Figures 3 and 4 may be fitted with similar air baffles. The use of either method of air distribution through the food trays in the trucks is contemplated and the adaptability for such use is believed to be obvious.

In practicing the refrigerating method as applied to the quick freezing of foods and in the operation of the apparatus shown in Figures 1 and 2, in conjunction with the trucks and trays shown in Figures 3 and 4, the heat transferring units 10 to 25 inclusive, in all stages or compartments 70 to 77 are cooled to the required freezing temperatures by delivering a calcium chloride brine of suitable temperature to the heat transferring units 24 and 25 located on the discharge end of the apparatus. Said brine may be circulated through the coils of the heat transferring elements in each stage or compartment so that any predetermined rise in the temperature of the brine may be obtained where it is discharged from each of the heat transferring stages or compartments, hence gaining a gradual increase in the temperature of the recirculated air streams in each food treating stage or compartment 70 to 77, inclusive, from the discharge end to the feeding end of the apparatus. For example, in this method of operation the first or precooling compartment 69 on the feeding end of the apparatus may be maintained at a temperature in the neighborhood of 35° F. where there is no air circulation. Thereafter, the trucks and trays with foods to be treated will be advanced into the first freezing compartment 70 wherein high velocity recirculated air contacts the foods at a temperature of 5° to 15° F. as may be desired, varying as required, for different kinds of foods. Thereafter, the foods will advance at fixed intervals by the conveyor 44 which advances the trucks in the apparatus at a distance equal to the accurate length of one stage or compartment. When trucks with trays are advanced from the first stage or precooling chamber 69, the insulated door 46 at the discharge end of the apparatus is opened and the truck with trays in the last stage or tempering chamber 78 is discharged from the freezer with foods frozen and tempered in readiness for the frozen foods to be packaged or stored. It will be noted, that the insulated door 45 at the feeding end of the apparatus should be closed when the conveyor is started and foods are being discharged from the apparatus. After the ten trucks with trays have been advanced, the first or precooling stage or compartment 69 will be empty and ready to receive another truck with foods on trays. When insulated door 45 is open for feeding a truck into the precooling stage or compartment 69, the door on the discharge end should be closed. This method of operation precludes the possibility of having both insulated doors 45 and 46 opened at the same time and therefore establishes a substantially closed recirculated air system since it is obvious that air cannot simultaneously go in and out of the same opening.

Owing to the temperature rise of the brine during its progressive passage through the coils of the heat transferring stages or compartments from the discharge end to the feeding end of the apparatus, the travel of trucks with food in counter direction to the flow of brine will cause the food to be subjected to a recirculated air temperature which is gradually lowered from the first stage or compartment 69 to the last stage or compartment 78. This progressive lowering of the food and recirculated air temperature as freezing progresses from the first to the last stage of treatment prevents the food from being subjected to large vapor pressure differentials between the food and recirculated air in each stage. In the freezing of individual frozen products such as peas, berries, lima beans and the like where such foods are in direct contact with the recirculated air streams this substantial reduction in the normal vapor pressure differential in conjunction with an accelerated condition of heat transfer from the foods to the high velocity air streams prevents excessive dehydration of foods during the freezing process.

In operating the apparatus shown in Figures 1 and 2 on the reverse heat transferring cycle as required for dehydrating foods, or any other material, the material is placed on the trays shown in Figures 9 and 10 and same are put into the trucks shown in Figures 3 and 4 or 7 and 8. The progressive movement of said trucks through the treating stages 69 to 78 at fixed intervals is the same as herein previously described for the treatment of materials for freezing. The length of time that the trucks remain in each stage is dependent upon the length of time required for treating the particular kinds of foods or materials being processed in each instance.

Likewise, the air circulation within the apparatus required for dehydrating foods is the same as hereinbefore described for the freezing treatment of foods. However, the temperatures of the air streams for freezing various kinds of foods will vary from plus 35° F. to minus 40° F. or lower. On the other hand, the temperatures of the air in the compartments in the material treating stages 70 to 77 will vary from plus 90° F. to as high as 200° F. The heat and temperature control of the various air streams serving the material treating stages or compartments 70 to 77 is accomplished in the heat transferring elements which have pipe coils running horizontally with vertical extended finned surfaces as shown in Figure 1 and the enlarged sections shown in Figures 15 and 16. The dehumidification of the air streams after said streams pass through each material treating stage or compartment 70 to 77 is accomplished by the heat transferring elements having vertical coils with finned surfaces placed horizontally as shown in Figure 1 and in the enlarged sections shown in Figures 17 and 18.

The heating of the air streams may be accomplished by supplying the heating elements with any convenient and economical source of heat energy such as hot water, exhaust steam, steam or super-heated steam. Likewise, the heat transfer elements for dehumidifying the air streams after they pass through any of the material treating stages or compartments 70 to 77 may be accomplished by supplying these elements with any convenient and economical cooling medium such as well water, cooling tower water or any water required to be heated for other purposes such as boiler feed water, blanching of fruits and vegetables and other warm water supply needs.

It will be noted by the arrows showing the direction of air flow in the material treating stages 70 to 77 that in each stage the recirculated air is heated prior to its passage over the foods on the trucks which form each food treating stage or compartment and thereafter the air contacts and flows through a dehumidifying heat transferring element and is again heated before passing through another food treating compartment. This method of alternately heating and dehumidifying the air of the zones before and after they pass through each material treating compartment is a continued repeated cycle as the fan 51 recirculates the two circulatory air streams.

The desirable physical actions resulting from this method of dehydrating materials consist of the following: Each air stream is heated and the relative humidity is to be lowered before it is directed across the materials being treated in each compartment at a high velocity. While contacting the foods in the compartment, moisture is rapidly evaporated from the foods to the air stream, which in turn increases the relative humidity of the air stream and effects a drying out or dehydration of materials being treated. Thereafter, the air is dehumidified by condensing moisture vapor out of the air stream and onto the cold surfaces of the dehumidifying element. Then the air is again heated to lower its relative humidity and continues on its course for repetitions of the cycle.

The food treating apparatus illustrated in Figures 5 and 5A comprises a rectangularly shaped food treating tunnel constructed and arranged in the same manner and of identical materials hereinbefore described and shown in the accompanying drawings in Figures 1 and 2, with provisions and arrangement shown for operating the apparatus with two or more fans, with the fan shafts extended through a fan housing and driven by a motor directly connected or through V belt drive external to the apparatus. The important advantages gained by this arrangement will be hereinafter fully described.

It will be noted that the arrangement provides for six separate and independent zones for circulatory air according to the arrows 701, 711, 721, 731, 741 and 751 which flow through twelve separate and independent food treating compartments 800 to 811. It will also be noted that there are two stages or compartments 812 and 813 which have no forced air circulation but are equipped with heat transfer elements or units on each side and the last two food treating compartments or stages are fitted with cooling elements only and are served with one independent circulatory air stream which is divided into two streams by utilizing the discharge air flow and return flow in the two separate compartments or stages. The heat transferring surfaces shown in this apparatus indicate the method utilized for the rapid and efficient treatment of foods by dehydration.

One method of supplying the heat transferring elements with heat transfer vehicles such as hot water and cold water to the apparatus of Figures 5 and 5A, is shown in the isometric and diagrammatic illustration in Figure 6 which consists of hot water supply pipe lines 90 which are equipped with an automatic thermo valve or air type thermostatically controlled supply valve 91 controlled and actuated by the temperature of the air stream off the heating elements 92, 93 and 94, respectively. Control valves 91 have stop valves 95 on each side with by-pass valve 96 for manual control when required. The heat transferring elements 92, 93 and 94 are fitted with return pipe line 97 as required to return the water for reheating and a repetition of the heat transferring cycle. Likewise the heat transferring elements 98, 99, 100, 101, 102, 103, 104, 105, 106, 107 and 108 are similarly supplied with recirculated hot water and automatically controlled at any predetermined temperature known to be optimum for the treatment of the foods being processed. The heat transferring elements 109, 110, 111, 112, 113, 114, 115, 116, 117, 118, 119, 120, 121 and 122 are similarly supplied by cold water supply and return lines 123 and 124 and controlled by the air temperature off each heat transferring stage as required to dehumidify the air streams prior to heating wherein the relative humidity is reduced as required to evaporate moisture from the foods being treated in each stage or compartment formed by the trucks, Figures 7 and 8, or trucks, Figures 3 and 4. In the case of treating the foods by quick freezing the reverse cycle of heat exchange is utilized in the heating elements 92 to 108 and supplying low temperature brine to said elements and dehumidifying heat exchange elements 109 to 122. The brine may be calcium chloride solution or any other suitable heat transferring vehicle and said low temperature brine is preferably supplied through hot water inlet connections 90 and cold water outlet connections 124 at the discharge end of the apparatus and circulated through the heat exchange elements via the by-pass valves 96, thereafter being discharged for recirculation and re-cooling through the return hot water outlet connections 97 and cold water inlet connections 123, thereby counter flowing the brine with respect to the direction of travel of the foods being treated in the tunnel as required to accomplish the economical and otherwise desirable conditions hereinafter fully described.

The trucks shown in Figures 7 and 8 accommodate and carry the food trays shown in Figures 9 and 10. The kind of material and method of construction is the same as hereinbefore described for the trucks shown in Figures 3 and 4 with the following exceptions: two trucks, such as shown in Figures 3 and 4, are secured by welding back to back with one air baffle division plate 125 (Fig. 8) similar in design, arrangement and construction to the air baffle 79 shown in Figures 3 and 4, with one large wheel 126 on each side located in the center with one small swivel wheel 127 located on each end of the truck as required for easy handling, rolling and guiding said truck with trays through the food treating tunnel on angle iron track guides 66 and 67. When this type of truck is used, an additional channel iron track guide (Fig. 7) 128 is provided in the center on the floor of the tunnel as required to further guide and direct the truck through the multistage food treating tunnel. Adjustable air baffles 129 are arranged on an incline under the food trays in each section of the truck as required to force the air upwardly through the food and trays when the air stream is flowing from right to left and downwardly through the food and trays when the air stream is flowing from left to right as occurs in the apparatus shown in Figures 1, 2, 5, 11, 12, and 13. The trays are shown in phantom in their respective positions and arrows indicate the direction of air flow in Figure 7.

The food trays illustrated in Figures 9 and 10 are used in conjunction with the trucks shown in Figures 3, 4, 7 and 8, and may be constructed of any suitable material, such as heavy open mesh galvanized or tinned screen 130 of iron or other preferred sheet metal each formed as shown and reenforced around edges with sheet metal 131, which is formed and pressed into position so as to provide a secure bond between the screen 130 and the reenforced sheet metal 131. Where the tray contacts the angle iron tray guides 89 shown in Figures 3, 4, 7 and 8, the sheet metal reenforcing 131 extends under tray on two sides to make such contacts and to provide a smooth surface for the sliding of tray into the truck on the tray guides.

The apparatus illustrated in Figure 11 comprises two rectangularly shaped food treating tunnels constructed and arranged in the same manner and of identical materials hereinbefore described and shown in the accompanying drawings, Figures 1 and 2, in conjunction with trucks shown in Figures 3, 4, 7 and 8 and trays shown in Figures 9 and 10, with provisions and preferred arrangement shown for operating the apparatus with two or more food treating tunnels. The important advantages gained by this arrangement will be hereinafter fully described. The use of this apparatus for dehydrating foods requires eliminators 132 for removal of condensation from air streams as they pass from the cooling elements 134. The eliminators are preferably made of galvanized sheet metal and may be formed in a series of V-shaped baffles similar to the conventional type eliminators used in conjunction with all air washing systems.

The apparatus illustrated in Figures 12 and 13 comprises two rectangularly shaped food treating tunnels constructed and arranged in the same manner and of identical materials hereinbefore described and shown in the accompanying drawings in Figures 1 and 2 to be used in conjunction with trucks shown in Figures 3, 4 or 7 and 8 with food trays shown in Figures 9 and 10 with provisions and arrangements shown for operating this apparatus with fan 135 located on top of the apparatus and delivering the air downwardly in four separate circulatory air streams formed by the fan division plate 136 and the center air division plate 137 which splits the air delivered from the fan into two equal parts, it being directed from right to left and the other from left to right. In addition this apparatus is fitted with two additional fans 138 and 139 as required for special and separate treatment of some foods in the first two stages on the food feeding end of the apparatus and the two last stages on the food discharge end of the apparatus. The important advantages gained from this arrangement will be hereinafter fully described.

The apparatus illustrated in Figure 14 comprises a rectangularly shaped food treating tunnel formed by heat transferring surfaces 140 and 141 on each side, same being continuous coils in each instance having feeding and discharge headers 142, 143, 144 and 145 with the required inlets and outlets. Otherwise the coils, finned surfaces, air stage baffles, truck guides and tracks, truck conveyor, insulated doors, hermetically sealed housing, air circulating and distributing ducts and air circulating fan 146 are arranged and constructed in the same manner and of identical materials hereinbefore described and shown in the accompanying drawing, Figures 1 and 2, in conjunction with the trucks shown in Figures 3, 4, 7 and 8 and trays shown in Figures 9 and 10 with provisions for arranging said trays to produce a method of air distribution shown in Figure 20.

In addition, this apparatus is fitted with air dehumidifying arrangements 147 and 148 which are located in the return air zones as streams to the recirculating air fan 146. Said dehumidifying elements are of the same design and construction as hereinbefore described and shown in the accompanying drawings in Figures 1 and 2. The return air duct housing to recirculating air fan is also fitted with air discharge ducts 149 and 150 together with fresh air intake ducts 151 and 152. On the discharge end of this apparatus the last stage or compartment is fitted with an air blower 153 having air supply inlet 154 and air discharge outlet 155 from compartment on the feeding end. The first stage or compartment has a similar air blower 156 together with air supply inlet 157 and air discharge outlet 158. The important and economical advantages gained from this arrangement and form of the invention will be hereinafter fully described in its method of operation.

The enlarged sections of heat transferring surfaces shown in Figures 15 and 16 also show their I beam supporting member 26a as shown in Figure 2 which rests on channel 40 shown in Figure 2 which is the typical form and arrangement of supporting the heat transferring surfaces mentioned in all forms of the invention and utilized in apparatus shown in Figures 1, 2, 5, 11, 12, 13 and 14. Likewise, the concrete flooring 28 with insulation 159 is identical in each form of the invention. Also, drip pans 26b as shown in Figure 2 are typical and used under each section of the coils forming each stage and compartment and are used to catch the drip from coil surfaces during defrosting in each form of apparatus shown and described in this invention. The finned surfaces 160 and coils 161 are also typical in design, construction and arrangement for all forms of the invention. The structural steel framework consisting of T-iron 41, angle iron 42 and side T-iron 39 as shown in Figures 1 and 2 also shows the typical arrangement and construction of the frame work used in all forms of the apparatus shown and described in the invention. Stage baffle 26 forms the separate stages or compartments within each apparatus as required for separating the air streams is also the same in each apparatus and as shown in Figures 1 and 2.

Figures 17 and 18 show the peculiar arrangement and form of extended finned surfaces 162 and 163 which are found to be required to eliminate the condensation on the heat transferring surface of the air dehumidifying coils 147 and 148 shown in Figure 14 and are the same as the ones used in conjunction with the air dehumidifying coils as hereinbefore shown and described for each form of the invention as in Figures 1, 2, 5, 11, 12, 13 and 14.

Figure 20 shows a peculiar arrangement of the trays shown in Figures 9 and 10 which experiments have shown to be found necessary to establish an extremely efficient method of distributing the recirculated and conditioned air through the foods that are being treated on the trays 172 shown in phantom and detailed in Figures 9 and 10 which are supported and guided on angle irons 89, top and bottom air baffles 83 and 84 of the trucks shown in Figures 3, 4, 7 and 8 are shown in spaced relation to the trays. This desirable method of air distribution and air circulation will be hereinafter fully described in connection with the mode of operation utilized in this invention.

The insulation 27a shown in phantom and insulating the top, sides and ends of the hermetically sealed housing of the apparatus shown in Figures 1, 2, 5, 11, 12, 13, 14 and 15 together with typical foundation insulation 159 for all forms in the invention as shown in the enlarged section of Figure 15 forms a complete envelope construction of insulation around all exposed surfaces of each apparatus so as to suitably retard heat transmission into any forms of the apparatus shown while materials are being treated by refrigeration, and likewise retard heat transfer outwardly from such apparatus when they are being used for processing materials by dehydration. The insulation may be of any suitable material such as cork, glass wool, redwood bark, hairfelt or the like, and same should be applied in accordance with manufacturer's specifications so as to form a continuity of insulation around all exposed surfaces of the apparatus as shown in Figures 1, 2, 5, 11, 12, 13 and 14.

It will be further noted that each recirculated air stream is cooled both before and after passing through each stage or food treating compartment and that the separate stages and compartments are formed by the sheet metal air baffle 79 on the back side of each freezing truck with trays shown in Figures 3 and 4. Said baffles 79 fit in true alignment and coincide with stage baffles 26 on each side, and when these trucks are in position in the apparatus the baffle on the back of each truck forms the separate compartments or food treating stages 69 to 78 inclusive and thereby separates the air stream through each food treating compartment with respect to the passage of the air streams in the adjacent compartment or food treating stages.

The same method of efficient heat transfer with a minimum of evaporation from the foods being treated may be practiced for precooling fruits and vegetables and the like before shipment or storage, or may be utilized for effecting an economical method of pre-freezing foods in large containers before they are put into freezer storage. In addition to the reduction of moisture loss during the freezing treatment of foods by reducing the vapor pressure differential presented by the foods as compared to the corresponding vapor pressure of the recirculated air, a further reduction of moisture loss from the foods being treated is accomplished by establishing a very small temperature rise of the air during its passage over the foods in each food treating stage or compartment resulting from the multistage method of air circulation in conjunction with a relatively small temperature difference between the recirculated air and the refrigerating medium used for cooling air in each food treating compartment.

Owing to a minimum of moisture evaporation from the foods and the prevention of warm outside air from entering and mixing with the recirculated air a very small amount of frost accumulation is deposited on the heat transferring surfaces, thus maintaining the heat transfer efficiency at a maximum and substantially reducing the time required or the necessity for frequently defrosting the heat transferring surfaces.

When defrosting is required, this may be speedily and economically accomplished by reversing the heat transferring cycle in the brine cooler. When ammonia is used as a primary refrigerant for cooling the brine, this may be accomplished by utilizing the condenser as an evaporator and the brine cooler as the condenser. The hot gas from the compressor being discharged to the brine cooler will heat up the brine rapidly while the brine pump circulates the warm brine through the heat transferring coils in each stage of the apparatus. This method of operation will rapidly defrost the heat transferring surfaces and the water from same will collect in the drip pans 26b shown in Figures 2 and 15 which are located under each section of the coils serving each air cooling stage 10 to 25, inclusive.

Extensive research and tests have shown that it is not necessary to lower the air temperature below its dew point in order to condense or precipitate moisture from the air prior to reheating. It has been found that by contacting the air stream with surfaces having a temperature well below the corresponding dew point of the air, condensation readily occurs on the relatively cool surfaces without substantially reducing the temperature of the air during its passage over said surfaces. Moreover, it was further found that by arranging the extended finned surfaces on the coils of the dehumidifying unit as shown in the enlarged sections of Figures 17 and 18, the condensed moisture could be eliminated from the air stream without the use of any other method for eliminating said free moisture, and it was further found that this method of air baffling during its passage through the dehumidifying element increased its efficiency. The condensed water vapor or free moisture drops by the effect of gravity to the drip pans 26b shown in Figure 2 and enlarged section in Figure 15, wherein water collects and may be periodically removed by any convenient means such as removing and dumping the pans, draining the water from the pans by pipe drains with the usual goose-neck trap or by pumping the water out with a conventional type suction pump.

The temperature and humidity control of the air streams during dehydration is exceedingly important since it is necessary to frequently change these conditions throughout the dehydrating compartments when changing from the treatment of one kind of food to another, and as required for maintaining peak production capacity on each kind of food being treated. For example, the quality of some foods will be adversely affected if the air temperature used for dehydration exceeds 140° to 150° F., while the quality of others is not affected with temperature as high as 180° to 200° F. With all other conditions equal, it is preferable to use the highest temperature possible without adversely affecting the quality of the foods since higher temperature air has a larger moisture carrying capacity and will therefore reduce the time required for treatment and thereby materially increase the production capacity of the apparatus. On the other hand, some foods such as cabbage and sweet potatoes will stand 160° to 170° F. in the early stages of the dehydration process, but the quality will be adversely affected if the temperature is not lowered to 140° F. in the finishing stages or compartments. Likewise, the relative humidity of the air in each dehydrating stage requires careful control. In some instances where dehydration is too rapid in the early stages owing to a high temperature and low relative humidity of the air, a close grained and dried out skin is formed on the external surface of each particle of food to be treated, making it extremely difficult to diffuse the internal moisture through this surface during the finishing treatment of the foods.

With full consideration of the above conditions, the necessity of maintaining accurate control of both the temperature and relative humidity of the air stream in each treating stage or compartment as the dehydrating treatment progresses will be readily understood. The method of controlling the air temperature of each circulatory air stream when steam is used consists of an indirect-acting air type thermostat of the gradual-movement type which acts to open or close the automatic valve 36 shown in Figure 2 which supplies steam to the heating stages as required to maintain the predetermined air temperature of the heating stage where the thermostat is located in the air stream. The relative humidity is likewise controlled by a wet bulb thermostat located in the air stream off the dehumidifying elements and which automatically control the amount of cooling water supplied to the coils of the elements through actuation of the automatic valves 36 shown in Figure 2. Further control of the relative humidity of the air streams may be gained by taking outside atmospheric air into the return air streams through inlet 56 and 57 and discharging a similar amount of air from the recirculated air streams through outlets 58 and 59. When the latter method is used, it is more desirable to use air intake vents shown in Figure 14 where intake air vents permit the incoming air to mix with the recirculated air immediately before the recirculated air enters the fan for recirculation and the air discharged from each circulatory air stream is expelled through the air vents 149 and 150. Before this air passes through the dehumidifying elements 147 and 148, it will be noted that in the form of apparatus shown in Figures 1 and 2 there are two air heating elements on each side of the first four dehydrating stages or compartments 70 to 73 inclusive; also, two air dehydrating elements on each side of these initial four dehydrating compartments. Likewise, the final dehydrating compartments 74 to 77 inclusive are similarly fitted with two air heating elements and two dehydrating elements on each side of these final treating compartments. Each automatically controlled steam valve 36 supplies two air heating elements. Hence, there are four of such valves used to maintain the required temperatures of the air streams, and four automatically controlled water valves which maintain the required relative humidity of the air streams through their wet bulb temperatures. Each automatic valve is supplied with stop valves on either side with by-pass valves and connections 38 as required for manual control as shown in Figure 2. Steam supply lines 29 and 30 furnish the required steam, and condensate from the heating elements is returned to the boiler feeding tank through return lines 33 and 35. Likewise, cooling water for the dehumidifying units is furnished through supply lines 31 and 32 and returned for re-cooling through return lines 34 and 34a as shown in Figure 2.

As previously described, all heat transferring elements are utilized for cooling the air when practicing refrigeration or freezing foods. The brine is supplied through the steam supply lines 29 and 30 and cold water supply lines 31 and 32 with stop valves 37 closed in each instance and a quantity of brine regulated by the by-pass valves 38, the brine being initially supplied to the heat transferring elements 24 and 25 located on the discharge end of the apparatus. After the brine has passed through the various heat transferring elements, it is returned for re-cooling by a conventional type brine cooler through return lines 33, 34, 34a and 35. When required, the brine supply to the various heat transferring elements may be automatically controlled by the simple addition of thermostats and brine type thermo-control valves.

A very important phase of the invention relates to the novel method of distributing the air over and through the particles of food on the trays while practicing the methods of treating foods by either dehydration, refrigeration or freezing. Particular attention is directed to the following: In addition to the reverse flow action of the air streams through the trucks and trays shown in Figures 3, 4, 7, 8 and 20, that occurs when they advance from one food treating compartment or stage to another, it will be noted, that a very important action of air flow and distribution occurs through the food on the trays of the truck. In this connection, and in reference to the arrangement of trays shown in Figure 20, it will be noted that this peculiar arrangement of food trays will force the air stream to flow upward through the first or top food tray, downward through the second food tray, upward through the third food tray, downward through the fourth food tray and likewise alternate this direction of flow throughout the remaining food trays on the truck while the air is being delivered and flowing from left to right. As the truck with food trays is advanced into the next food treating compartment or stage, the air then flows from right to left which in turn reverses the upward and downward flow of the air through the foods on the trays. As indicated by the arrows showing the direction of air flow, it will at once be obvious that this arrangement of food trays on the truck now forces the air downwardly through the first or top food tray, upwardly through the second tray, downwardly through the third tray, upwardly through the fourth tray and a similar reverse action of upward and downward air flow through the foods on the trays will occur throughout the remaining trays. Hence, in addition to alternately reversing the direction of air flow as the trucks with trays advance from one food treating stage or compartment to another, the upward and downward flow through the foods is also reversed. This novel method of air distribution embodying a double reverse flow action of the air over and through the particles of foods on the trays as the trucks are intermittently advanced from stage to stage as the treatment of food progresses during its passage through the apparatus is exceedingly important. While dehydrating foods, a further and very important advantage resulting from this method of air distribution and circulation of air through the foods on the trays, consists of agitating small particles of foods in the trays during their passage through the final three of four treating compartments or stages 74 to 77 inclusive. This action is accomplished by using an additional cover screen, not shown, for the food trays illustrated in Figures 9 and 10, but which is made of the same material as the tray screen 130 and later described in connection with Figures 9 and 10. During the initial stage of the dehydrating process which takes place in food treating compartments or stages 70 to 73, small particles of food normally stick together and thereby reduce the evaporated surface of each particle and materially increase the time required for processing. Experiments, tests and research work have shown that high velocity air passing upwardly through the trays, when said trays are arranged as shown in Figure 20, cause the particles to be agitated and move about by tumbling from one side of the tray to the other. Of course, when the foods are advanced into the next stage, they are agitated and tumble to the opposite side of the tray. This very desirable action is caused by the reduced weight of the food particles, since they have lost approximately 40% to 50% of their moisture content when the food has reached this stage of the process. This action further breaks apart and separates each individual part of food and thereby reduces the processing time very materially, without considering the resulting improvement in the quality or form of the finished product. This screen cover for the trays hereinbefore mentioned is used to prevent the particles of foods from being carried off the trays by the high velocity air streams. Research work and tests have shown that this method of air distribution will reduce the time required for completing the food treatment of various foods from 40% to 60% and proportionally increase the capacity of the food treating apparatus. Moreover, it is well known and fully recognized by those familiar with the art, that the quality and appearance of foods processed by quick freezing or dehydration is proportionally improved as the time of processing is reduced. Hence, these advantages and improvements in the art form a very important part in my invention.

I wish to emphasize that the dehydrating, drying, refrigerating, and freezing of various kinds of foods and other materials not only requires a considerable variation in the temperature and relative humidity of the air but often requires a treatment prior to and following the process as hereinafter provided and fully described in connection with the forms of the invention shown in Figures 5, 11, 12, 13 and 14. Therefore, I want to point out that minor changes embodying the addition or omission of certain parts of the invention as shown and described in the various forms in Figures 1 to 20 inclusive, is contemplated, it being understood that all parts in the arrangements shown and described are interchangeable as is required to adequately fulfill the flexibility and the particular treatment best suited for processing and handling of various kinds of materials. For example, it will be noted that the food treating compartment or stages 69 to 78 as shown in Figures 1 and 2, are simply used as air locks for the recirculated air streams. Yet, it is contemplated that these compartments may be used for additional treatment of certain materials as hereinafter fully described in connection with the forms of the invention shown in Figures 5, 11, 12, 13 and 14. Likewise, the arrangement of two of the fans shown in Figure 5 may be used instead of the one fan and thereby establish four separate circulatory air streams serving the food treating compartments or stages 70 to 77 inclusive instead of the two circulatory air streams as provided for and shown in Figure 1.

I wish to further point out that the selection of heat transferring vehicles best suited for processing the various kinds of foods is a matter requiring special consideration in each instance and this necessarily will depend upon the most economical source available. For instance, a plant proposing to install the apparatus for dehydration and freezing purposes, may have a plentiful supply of cold water which requires heating. Naturally, in this instance it would be very economical to heat the required water by passing it through the air dehumidifying elements of the apparatus and thereby accomplishing the dual purposes of raising the temperature of the water and also supplying some of the additional heat required for further use in the plant. On the other hand, a plant located where a relatively dry atmospheric air condition prevails during the dehydrating season, it no doubt would be more economical to discharge some of the warm and high humid air from the recirculated air streams and replace this air with a dry outside atmospheric air as needed to lower the relative humidity of the recirculated air stream as required for dehydrating materials.

Furthermore, it is believed to be obvious that the above two methods of dehydrating the air streams may be utilized as hereinafter fully described in connection with the form of the invention shown in Figure 14 which consists of using some water and part atmospheric air for dehumidifying and lowering the relative humidity of the air streams for dehydration purposes.

Again, a plant proposing to install an apparatus for dehydrating purposes may have an adequate supply of hot water available, having a temperature in the neighborhood of 170° F., which would otherwise be wasted, or it may have a large amount of exhaust steam which is being wasted. In either instance the source of heat required for dehydrating purposes could be utilized.

Moreover, when a plant proposes to freeze and dehydrate foods, certain conditions may prevail wherein it may be desirable and economical to use direct expansion ammonia for evaporation within the coils as needed to furnish suitable freezing temperatures in the air streams as required for freezing foods. When this apparatus is used for dehydrating foods, the cycle of heat exchange in the refrigerating system can be reversed as required for furnishing heat to the air heating elements in the apparatus for dehydrating purposes. This can be easily accomplished by utilizing the ammonia condenser as an evaporator and the heat transferring elements in the apparatus as ammonia condensers. Of course, cooling tower water or other sources of heat input to the original condenser would have to be used in this method of operation.

With full consideration of the importance of utilizing the available or most economical source of heat or refrigerating effect available, it is believed to be apparent that I contemplate and propose using the kind of heat transferring vehicles best suited and most economical for each individual purpose. The design and arrangement of parts shown in the forms of the invention in Figures 1 to 20, inclusive, have provided for and include the necessary flexibility required to utilize any of the various heat transferring vehicles above mentioned.

In the operation of the truck shown in Figures 3 and 4 in conjunction with the forms of the invention shown in Figures 1, 2, 5, 11, 12, 13 and 14, as previously mentioned, the truck is moved forward at fixed intervals, depending upon the time required to treat the materials, for a distance of one stage or compartment by the conveyor 44. Said conveyor is typical with all forms of the apparatus shown in Figures 1, 2, 5, 11, 12, 13 and 14. In each instance, when the truck is advanced in Figure 1 from the compartment or stage 69 to 70 it advances all the trucks ahead of it the distance of one stage or compartment so that the air baffle 79 on the back of each truck coincides with the stage baffles 26 on each side and thereby forms the separate compartments or stages throughout the apparatus so that the circuitous air streams have a free flow through each stage or compartment and are thereby prevented from mixing with the air streams passing through the adjacent compartments or stages. When all trucks are advanced, the truck in compartment 78 is discharged out of the apparatus and the first stage or compartment 69 is empty and ready to receive the following truck with foods to be processed.

The peculiar arrangement of food trays in the truck shown in Figure 3 will be noted. The angle on which the trays are set causes the high velocity air stream to brush the top surfaces of the food and thereby force some air downwardly through the food when the air stream is passing from left to right as the arrows showing the direction of air flow indicate. As this truck with trays is advanced to the next stage and the air flow through the truck and trays is from right to left the high velocity air stream contacts the bottom of all trays and thereby forces some air upwardly through the foods during its passage between the trays, as the arrows showing direction of air flow indicate.

This method of air distribution through the foods and over the foods on the trays, both top and bottom, is very uniform and effective for the acceleration of heat exchange or evaporation of moisture from the foods.

The apparatus shown in Figures 5 and 5A is arranged with three fans 51, each fitted with two air impeller wheels with a division plate 52 between each, being the same as shown in Figure 1. This arrangement provides for two circuitous air streams circulated by each fan as each circuitous stream in turn serves two food treating compartments formed by the truck shown in Figures 3 and 4. Hence, there are six circuitous air streams which form twelve independent zones having air flowing through twelve separate food treating stages or compartments. The purpose of this arrangement is to give more accurate control and greater range of air temperatures and corresponding relative humidities of the various air streams as may be required in the treatment of certain kinds of materials by dehydration.

Figure 6 is an isometric and diagrammatic illustration of supply lines 90 and 123, return lines 97 and 124, automatic control valves 91, with stop valves 95 and by-pass connections with valves 96 for supplying the heat transferring vehicles to the air cooling or heating elements 98 to 122 inclusive, the operation of which for dehydrating or freezing foods has been hereinbefore described.

It will be noted, that heat transferring elements 105 to 108 on the feeding end of the apparatus shown in Figures 5 and 5A have been provided without any forced air circulation. This arrangement is preferable when such foods as fish and poultry are required to be pre-cooled before freezing. However, steam pipes may also be included in this arrangement as required for supplying steam for blanching fruits and vegetables prior to subjecting such foods to the dehydrating treatment. It will also be noted that there is nothing provided in the last or final stage of this form of the invention. However, as before mentioned, a circulating fan similar to the one shown in Figure 14, together with atmospheric air inlets and air outlets may be used as required for pre-cooling dehydrated foods and fixing the final moisture content of such foods before being discharged from the apparatus. Likewise, when the appaartus is being used for dehydrating fruits and vegetables which require blanching, steam pipes are provided as before mentioned and a fan may be installed for recirculating and distributing the steam over the foods uniformly, such fan being similar to and arranged like the fan with inlet and outlet connections shown in Figure 14.

Moreover, when climatic conditions favor the partial use of outside atmospheric air for lowering the moisture content of the recirculated air streams, all heat exchange coil surfaces may be arranged as the continuous coils 140 and 141 shown in Figure 14, and the fan housing will then have high humid air outlets similar to 149 and 150 with atmospheric air inlets 151 and 152 as shown in Figure 14. Such an arrangement may be used with or without the air dehumidifying elements 147 and 148 shown in Figure 14, depending upon the prevailing atmospheric conditions during the season of the year when the apparatus will be used for dehydrating purposes.

It will be further noted that the motor and drive for the fans in the form of the invention shown in Figures 5 and 5A is located externally of the apparatus. However, it is obvious that the motor and drive for fans may be enclosed in the fan housing or external thereto, in any form of the apparatus herein disclosed, without in any way conflicting with the new and novel method herein described and claimed.

The principal advantages of the food truck with trays shown in Figures 7 and 8 consist in ease of handling owing to the large center wheels 126 and relatively small end swivel wheels 127; larger holding capacity for foods per unit, and disposition of air baffles 129 which force the air stream up through the foods on the food trays shown in Figures 9 and 10 when the air stream is traveling from right to left and down through the foods on said food trays when the air stream is traveling from left to right. The air baffles are adjustable so that the quantity of air which passes through the trays in either instance can be regulated. The forms of the invention shown in Figures 11 and 14 are arranged with air stage baffles in the heat transferring elements so as to coincide with a center air baffle 125 shown in Figures 7 and 8. However, this type of truck with food trays may be used in conjunction with the forms of the invention shown in Figures 1, 2, 5, 12 and 13 by simply changing the arrangement of stage baffles 26 shown in Figures 1 and 2 and this arrangement is contemplated where it is economical and best suited to meet peculiar requirements.

The food tray shown in Figure 9 with an enlarged cross section view, Figure 10, of one corner to better show the construction is used in conjunction with the trucks shown in Figures 3, 4, 7, and 8 which in turn may be used for treating foods in all forms of the invention as shown in Figures 1, 2, 5, 11, 12, 13 and 14. As previously mentioned, when small particles of food such as cubed carrots or sweet potatoes, shredded onions, peas, beans and the like are subjected to the dehydrating treatment in the various forms of the invention shown and described, an open mesh iron screen cover is used over each tray and supported by the reenforced edge 131 of the tray. The arrangement with cover performs an exceedingly important function when such foods are subjected to the dehydrating treatment which consists of agitating the material within each tray by the high velocity air streams in the food treating compartments after the food has become relatively light following partial dehydration. The changing of the direction of air flow through the trays and food as they are advanced from one food treating compartment to the next causes the food particles to tumble from one side to the other and thereby serves each individual piece of food. The important advantages gained by this action have been hereinbefore fully described.

The form of the invention shown in Figure 11 simply shows the arrangement of an apparatus for practicing the invention wherein two separate tunnels with only one air circulating fan are used. This form of the invention is particularly suited for dehydrating, refrigerating or freezing two different kinds of foods simultaneously, each of which require a different length of time for processing. For instance, packaged foods such as spinach and asparagus may be processed in one treating tunnel while individual frozen products requiring much less time than the packaged foods are in the other tunnel. The operation of each tunnel can be regulated accordingly. Likewise, a similar advantage is gained when it is necessary to dehydrate relatively large pieces of food and comparatively small pieces of food simultaneously. When foods are treated by the dehydrating process it is necessary to have moisture vapor condensation eliminator 132 between the cooling and heating elements 133 and 134 as shown, to prevent the condensation from being carried by the air stream from the cooling elements 133 to the heating elements 134, which in turn would cause this water to change back to water vapor and thereby increase the relative humidity of the air streams and reduce the dehydrating capacity of the apparatus. Otherwise, it will be readily seen that this form of the invention is the same as the single tunnel arrangement, the details of which are shown in Figure 14.

The forms of the invention shown in Figures 12 and 13 provide for two food treating tunnels with an air recirculating fan for each tunnel located on top of the apparatus instead of on the side as shown in the other forms of the invention in Figures 1, 2, 5, 11 and 14. The advantages gained in this form and arrangement of apparatus consist of a saving in floor space per unit quantity of foods processed where there is sufficient head room to accommodate a fan located on top of the apparatus. As shown, this form of the invention provides for four separate circulatory air streams with the use of only one fan 135, and each circulatory air stream serves four separate food treating compartments. In addition to the air baffle 136 between the two air impeller wheels in the fan, there is a second air splitting baffle 137 which divides the air stream delivered from the fan downwardly into the two equal parts by volume, one part being delivered to the right and the other to the left, each following the course through the food treating stages as shown by air flow arrows.

This form of the invention provides for an air recirculating fan 138 to serve the first two food treating stages in each tunnel. The purpose of this arrangement is to preheat certain materials to optimum temperature before they are subjected to the dehydrating effect of the air streams from the main recirculating fan 135, by removing the sensible heat from the materials so that they are ready for the dehydrating process. This preheating treatment of certain materials that do not require blanching is often very desirable and somewhat an absolute necessity in providing adequate dehydrating treatment. Likewise, in the refrigerating and freezing treatment of some comestibles, it is very important to adequately pre-cool some foods before they are subjected to low temperature air streams and subsequent freezing processes as hereinbefore mentioned. This preheating or pre-cooling arrangement is adaptable to all forms of the invention shown in Figures 1, 2, 5, 11 and 14 and the use of this arrangement is contemplated since it is believed to be obvious that it is well within the scope of the invention.

Another air recirculating fan 139 is provided as shown in Figures 12 and 13 for recirculating air through the final two food treating compartments of each tunnel as required for cooling and fixing a definite moisture content of foods being treated by the dehydrating process. The important advantages gained by this final treatment consist of cooling the dehydrated products before they are discharged from the apparatus so that they may be promptly packaged and put in storage without further treatment and so that a predetermined moisture content of the material can be fixed within a very narrow range which assures uniformity, and adequately controls this important factor. On the other hand, when foods are being treated by the refrigerating or freezing process, these last two food treating compartments are utilized for tempering the foods to a uniform fixed temperature before they are discharged from the apparatus so that such foods will not be adversely affected by a fluctuating temperature which often occurs in the conventional type quick freezing system. Moreover, this final treatment of foods, which have varying sizes and shapes such as berries and the like, assure an even and uniform temperature of each particle of food before it is discharged from the apparatus and this in turn prevents warm spots from occurring in the foods after packaging due to the high temperature or unfrozen sections of relatively large particles of food. As previously mentioned, all forms of the apparatus as shown in Figures 1, 2, 5, 11 and 14 have space to accommodate this arrangement where and when required for pre-cooling and fixing the moisture content of foods after dehydration or finally tempering the foods to a uniform temperature after the refrigerating or freezing process.

In the form of the invention shown in Figure 14, the heat transferring elements 140 and 141 are continuous and have inlet headers 144 and 145, and outlet headers 142 and 143 for the passage and circulation of the heat transferring vehicles as required for dehydrating, refrigerating or freezing materials. When steam is used as a heat transferring vehicle for dehydrating foods, a conventional type condensate steam trap is used for draining the coils of condensate and returning same to boiler feed tank. It will be noted that the air partition baffles 26 in Figure 1 are arranged in the apparatus shown in Figure 14 so as to accommodate the trucks with trays shown in Figures 7 and 8. However, it is believed to be apparent that the additional baffles 26 in Figure 1 could be used in this apparatus as required to accommodate the trucks with trays shown in Figures 3 and 4. In fact, it is not necessary to install said baffles in this apparatus since there would always be a baffle on the back of each truck which would coincide and be in alignment with the air partition baffles used in conjunction with the heat transferring elements. The only difference being that each air stream would be serving two trucks in each food treating compartment. Otherwise, the intermittent and progressive movement of trucks with materials being treated is identically the same as hereinbefore described in connection with other forms of the invention and as shown in Figures 1, 2, 5, 11, 12 and 13. This form of the invention shows a novel and often desirable location and arrangement of the dehumidifying coil elements 147 and 148. It will be noted that these dehumidifying elements are located in the return end of each circuitous air stream at a point immediately before said air streams enter the fan for repetition of the air circulating cycle. At these points the return air will closely approach saturation owing to the moisture from the foods being dehydrated during its passage through the dehydrating compartments or stages.

It will be further noted that air outlet ducts 149 and 150 are located so that part of the saturated air in each circuitous air stream may be discharged from the apparatus before the stream passes through the dehumidifying elements 147 and 148. Likewise, the corresponding amount of air discharged through the ducts 149 and 150 is taken from the outside atmosphere through inlet air ducts 151 and 152, and mixed with each circuitous air stream after said streams have passed through the dehumidifying elements 147 and 148 as may be economical and desirable under certain conditions of operation to further reduce the relative humidity of the recirculated air streams before being discharged from the fan 146 for a repetition of the dehydrating and recirculating cycles.

The fan 156 may be used for recirculating purposes when steam blanching of fruits and vegetables is required in the first treating stage or compartment. When the fan 156 is used for such purpose, return fan ducts 157 and 158 are connected together for recirculating and distributing the steam over the foods on the trays. After blanching has been accomplished, part of the air returned through duct 158 is discharged into the atmosphere and an equal quantity of outside air is taken into the return duct 157 for circulation over the foods on the trays. This action prevents overheating of the foods after blanching and starts the first phase of dehydration.

When foods are being treated by refrigeration or freezing, fan 156 may be used in this initial stage for precooling some materials before they are subsequently subjected to the freezing treatment by recirculating the air in this initial stage or precooling compartment.

When materials are being subjected to the dehydrating process, the air circulating fan 153 provides circulation of air over the foods in the final food treating compartment for the purpose of precooling the materials down to a temperature approaching that of the atmosphere before they are discharged from the apparatus. Outside atmospheric air is delivered to the fan through duct 154 and discharged from the final treating compartment or stage through air discharge duct 158. As previously mentioned, this arrangement not only provides for cooling the materials down to a temperature that permits their immediate packaging and storage without any further treatment by a regulation of a damper in the duct 154 as required to permit a given volume of air to be circulated through the foods in this final treating compartment or stage, but will also uniformly fix the moisture content of all materials treated by the dehydrating process before they are discharged from the apparatus.

When foods are being treated by the refrigerating or freezing process, fan 153 is used for recirculating air in the final compartment or tempering chamber by connecting discharge air duct 155 to the fan inlet duct 154. This method of operation will uniformly temper foods and the like to a fixed temperature throughout, and will assure an even and uniform temperature in irregular and variously sized particles of the materials being treated before they are discharged from the apparatus, thereby eliminating fluctuations of temperature within the foods and permitting prompt packaging or storage without any further treatment or damage resulting from the lack of this final treatment.

The enlarged section shown in Figure 15 is illustrative of the typical arrangement of heat transferring surfaces for heating the recirculated air during the dehydrating processes or cooling the recirculated air during the refrigerating or freezing processes with pipe coils 161 and extended heat transferring finned surfaces 160 together with stage or compartment air partition baffle 26. Figure 15 also shows the I-beam 26a for supporting the heat transferring surfaces and rests on the supporting channel iron 40 anchored in the concrete flooring 28 to form an integral part, insulation 159 being shown under the concrete floor. Condensate or drip from coils collects in the drip pans 26b which are arranged as shown under the heat transferring coil and finned surfaces. The housing frame on which the said material is secured and hermetically sealed is shown on top by T-iron joist 41 and angle iron side channel 42. The side columns secured to and supporting the top framework are shown in Figure 16, as column 39.

Figure 16 shows the typical arrangement of heat transferring surfaces including pipe coils 161 with extended finned surfaces 160, and general arrangement of air partition baffle 26 in Figure 1. Also, T-iron side frame column 39.

Figures 17 and 18 show the arrangement of coils 161 with extended finned surfaces 162 and 163 used in the air dehumidifying elements as used in connection with all forms of the apparatus included in this invention, Figures 1, 2, 5, 11, 12, 13 and 14. As shown in Figure 17 the finned surfaces 162 have the parts thereof at opposite sides of the coils 161 angularly extending in straight line opposite directions, while in Figure 18 the opposite sides of the finned surfaces 163 are continuously curved. Considerable research and practical operating tests have shown that the design and arrangement of finned surfaces 162 or 163 will eliminate condensation from water vapor without the use of any other means for eliminating free moisture from the atmosphere. Moreover, it has been found, as hereinbefore described, that this method of eliminating free moisture from the recirculated air streams precludes the necessity of lowering the temperature of the air streams below their corresponding dew point in order to precipitate moisture from said air streams prior to reheating and recirculation. An important phase of this invention consists in the finding that by contacting said air streams with a surface having a temperature below the corresponding dew point of the air, condensation of moisture from the air streams readily occurs without substantially reducing the sensible temperature of the air in said streams.

In Figure 20 the food trays 172 are shown in phantom. Only the top and bottom truck baffle plates 83 and 84 and food tray angle supports 89 for use in Figures 3, 4, 7 and 8 are illustrated. Arrow lines indicate the method of air distribution and circulation over and through the foods on the trays, the direction of air flow being reversed when the truck with trays progressively advances through the food treating compartments or stages in each form of the invention shown in Figures 1, 2, 5, 11, 12, 13 and 14. The importance and efficiency relative to this method of air distribution and circulation has been previously described and forms a very important and basic phase of the novel improvements embodied in this invention.

In addition to the flexibility of the invention as hereinbefore described for treating materials, foods and the like by multistaging the heat transfer during the refrigerating and freezing processes and likewise multistaging the evaporation of moisture from the materials being treated during the dehydrating process, it is to be noted, that it is contemplated to use the novel method and apparatus for rapid precooling of fruits and vegetables before shipment or storage, congealing or solidifying chemical substances and the like, drying or partially dehydrating chemicals and other substances requiring a similar treatment, and reclaiming and otherwise salvaging chemicals that have been vaporized by condensing same to a liquid state. The utilization of the method and apparatus for these and other purposes wherein materials or substances require such treatment is believed to be obvious.

From the disclosure, drawings and detailed description of the invention, it is believed that the construction, operation and wide range of flexibility incorporated therein, will at once be apparent, it being noted that there is herein provided a novel method of multistaging heat and moisture transfer and an economical apparatus which utilizes the reverse cycle of heat exchange so that the single apparatus may be used for the dual purposes hereinbefore described.

While there are herein shown and described the preferred embodiments of the present invention, it is nevertheless to be understood that changes may be made herein without departing from the spirit and scope of the invention as claimed.

I claim:

1. Apparatus of the class described comprising a relatively air-tight housing provided with an entrance and an exit, closure means for the entrance and the exit, laterally spaced rows of temperature changing units forming a path between them, baffles in said temperature changing units disposed transversely with respect to said path, trucks to move the material for treatment along the said path, said trucks having vertical baffles intermediate their ends disposed transversely with respect to said path and which align successively with the first-mentioned baffles on opposite sides thereof at the progressive positions of the trucks during movement through the apparatus to form transverse air compartments, blower means, and conduit means coacting with said baffles for circulation of air in a tortuous course through the said compartments.

2. Apparatus of the class described comprising a relatively air-tight housing provided with an entrance and an exit, closure means for the entrance and exit, spaced rows of temperature changing units forming a path between them, baffles in said temperature changing units disposed transversely with respect to said path, trucks to move material for treatment along said path, second spaced rows of temperature changing units forming a path between them, baffles in said second temperature changing units transverse with respect to said second path, trucks to move material along said second path, the trucks of both rows having vertical baffles intermediate their ends disposed transverse to said paths and adapted to align successively with the adjacent baffles on opposite sides thereof at progressive positions of the trucks during movement through the apparatus to form transverse air compartments, blower means disposed approximately centrally of the apparatus and adjacent the top thereof, and conduit means associated with the blower means and co-acting therewith and with said baffles to circulate air in a tortuous path through the compartments.

3. Apparatus of the class described comprising a relatively air-tight housing provided with an entrance and an exit, closure means for the entrance and the exit, laterally spaced rows of temperature changing units forming a path between them, baffles in said temperature changing units disposed transversely with respect to said path, each lateral row containing a heating unit and a cooling unit, trucks to move the material for treatment along the said path, said trucks having vertical baffles intermediate their ends disposed transversely with respect to said path and which align successively with the first-mentioned baffles on opposite sides thereof at the progressive positions of the trucks during movement through the apparatus to form transverse air compartments, blower means, and conduit means coacting with said baffles for circulation of air in a tortuous course through the said compartments.

4. Apparatus of the class described comprising a relatively air-tight housing provided with an entrance and an exit, closure means for the entrance and the exit, laterally spaced rows of temperature changing units forming a path between them, baffles disposed transversely with respect to said path, trucks to move the material for treatment along the said path, said trucks having vertical baffles intermediate their ends disposed transversely with respect to said path and which align successively with the first-mentioned baffles on opposite sides thereof at the progressive positions of the trucks during movement through the apparatus to form transverse air compartments, blower means, and conduit means coacting with said baffles for circulation of air in a tortuous course through the said compartments.

5. Apparatus of the class described comprising a relatively air-tight housing provided with an entrance and an exit, closure means for the entrance and exit, spaced rows of temperature changing units forming a path between them, baffles in said temperature changing units disposed transversely with respect to said path, trucks to move material for treatment along said path, second spaced rows of temperature changing units forming a path between them, baffles in said second temperature changing units transverse with respect to said second path, said temperature changing units in the said rows at portions thereof being alternately heating units and cooling units, trucks to move material along said second path, the trucks of both rows having vertical baffles intermediate their ends disposed transverse to said paths and adapted to align successively with the adjacent baffles on opposite sides thereof at progressive positions of the trucks during movement through the apparatus to form transverse air compartments, blower means disposed approximately centrally of the apparatus and adjacent the top thereof, and conduit means associated with the blower means and coacting therewith and with said baffles to circulate air in a tortuous path through the compartments.

WILLIAM J. FINNEGAN.

REFERENCES CITED

The following references are of record in the file of this patent:

UNITED STATES PATENTS

| Number | Name | Date |
|---|---|---|
| 2,370,825 | Veit | Mar. 6, 1945 |
| 1,446,054 | Mans | Feb. 20, 1923 |
| 2,172,059 | Chilton | Sept. 5, 1939 |
| 747,788 | Smith | Dec. 22, 1903 |
| 1,402,306 | Maus | Jan. 3, 1922 |
| 1,119,011 | Grosvenor | Dec. 1, 1914 |
| 2,288,154 | Cobb | June 30, 1942 |
| 1,365,910 | Goodhue et al. | Jan. 18, 1921 |
| 1,543,073 | Fiege | June 23, 1925 |
| 1,593,378 | Younger | July 20, 1926 |
| 1,608,263 | Fiege | Nov. 23, 1926 |
| 1,319,605 | Morton | Oct. 21, 1919 |
| 1,355,117 | Allsop et al. | Oct. 12, 1920 |
| 1,539,230 | Anderson | May 26, 1925 |
| 2,050,597 | Younger | Aug. 11, 1936 |
| Re. 14,528 | Andrews | Oct. 8, 1918 |
| 1,295,946 | Wittenberg et al. | Mar. 4, 1919 |
| 1,718,845 | Younger | June 25, 1929 |
| 1,405,781 | Harris | Feb. 7, 1922 |
| 1,737,259 | Miller | Nov. 26, 1929 |
| 2,295,732 | Hess | Sept. 15, 1942 |
| 279,844 | Teasdale | June 19, 1883 |
| 1,443,367 | Kennedy | Jan. 30, 1923 |
| 1,082,743 | Gettelman | Dec. 30, 1913 |
| 109,068 | Smith | Nov. 8, 1870 |
| 1,372,112 | Wittenberg | Mar. 22, 1921 |
| 2,237,257 | Finnegan | Apr. 1, 1941 |
| 1,353,167 | Luther | Sept. 21, 1920 |

FOREIGN PATENTS

| Number | Country | Date |
|---|---|---|
| 269,064 | Great Britain | Apr. 14, 1927 |
| 517,167 | Germany | Jan. 31, 1931 |